(12) United States Patent
Fowers et al.

(10) Patent No.: US 12,437,765 B2
(45) Date of Patent: Oct. 7, 2025

(54) SPATIAL AUDIO CONVERSATIONAL ANALYSIS FOR ENHANCED CONVERSATION DISCOVERY

(71) Applicant: MICROSOFT TECHNOLOGY LICENSING, LLC, Redmond, WA (US)

(72) Inventors: Spencer G. Fowers, Duvall, WA (US); David Anthony Tittsworth, Gig Harbor, WA (US); Amber Dawn Hoak, Silverdale, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 18/760,626

(22) Filed: Jul. 1, 2024

(65) Prior Publication Data

US 2024/0355331 A1 Oct. 24, 2024

Related U.S. Application Data

(62) Division of application No. 17/357,891, filed on Jun. 24, 2021, now Pat. No. 12,057,122.

(51) Int. Cl.
*G10L 15/22* (2006.01)
*G06F 3/16* (2006.01)
(Continued)

(52) U.S. Cl.
CPC .............. *G10L 15/26* (2013.01); *G06F 3/165* (2013.01); *H04M 3/568* (2013.01)

(58) Field of Classification Search
CPC . G10L 15/1815; G10L 15/26; H04L 65/4015; G06F 21/577; G06F 3/165; G06F 16/35; G06F 40/30; H04M 3/568
(Continued)

(56) References Cited

U.S. PATENT DOCUMENTS

| | | | |
|---|---|---|---|
| 2015/0193482 A1* | 7/2015 | Kaushansky | G06F 16/35 707/741 |
| 2021/0168110 A1* | 6/2021 | Marmar | G06F 40/30 |
| 2022/0345426 A1* | 10/2022 | Demmer | H04L 51/04 |

OTHER PUBLICATIONS

Communication pursuant to Article 94(3) EPC Received for European Application No. 22735055.0, mailed on Jun. 27, 2025, 06 pages.
(Continued)

*Primary Examiner* — Md S Elahee
(74) *Attorney, Agent, or Firm* — Newport IP, LLC; Jacob P. Rohwer

(57) ABSTRACT

Systems and methods for providing enhanced teleconferencing. An example method includes receiving audio streams from a plurality of client devices of participants of a teleconference; converting the audio streams for a first conversation within the teleconference into first text; converting the audio streams for a second conversation within the teleconference into a second text; analyzing the first text to identify one or more topics being discussed in the first conversation; analyzing the second text to identify one or more topics being discussed in the second conversation; and presenting, in a teleconference user interface, at least one of the one or more topics being discussed in the first conversation or the one or more topics being discussed in the second conversation.

16 Claims, 29 Drawing Sheets

(51) Int. Cl.
 *G10L 15/26* (2006.01)
 *H04M 3/56* (2006.01)
(58) Field of Classification Search
 USPC .......................................................... 704/235
 See application file for complete search history.

(56) References Cited

OTHER PUBLICATIONS

Communication under Rule 71(3) received for European Application No. 22735683.9, mailed on Jul. 24, 2025, 7 Pages.

* cited by examiner

500

```
┌─────────────────────────────────────────────────────────────┐
│  GENERATE A TELECONFERENCE INTERFACE WITH A PLURALITY OF    │
│   USER-CONTROLLED PARTICIPANT INTERFACE ELEMENTS            │
│      REPRESENTING PARTICIPANTS OF THE TELECONFERENCE        │
│                                                             │
│                           502                               │
└─────────────────────────────────────────────────────────────┘
                              ▼
┌─────────────────────────────────────────────────────────────┐
│   IDENTIFY A FIRST CONVERSATION BASED ON POSITIONS, IN THE  │
│  TELECONFERENCE INTERFACE, OF A FIRST SUBSET OF THE         │
│              PARTICIPANT INTERFACE ELEMENTS                 │
│                                                             │
│                           504                               │
└─────────────────────────────────────────────────────────────┘
                              ▼
┌─────────────────────────────────────────────────────────────┐
│  IDENTIFY A SECOND CONVERSATION BASED ON THE POSITIONS, IN  │
│    THE TELECONFERENCE INTERFACE, OF A SECOND SUBSET OF THE  │
│              PARTICIPANT INTERFACE ELEMENTS                 │
│                                                             │
│                           506                               │
└─────────────────────────────────────────────────────────────┘
                              ▼
┌─────────────────────────────────────────────────────────────┐
│  ACCESS SUPPLEMENTAL DATA, FROM AT LEAST ONE OF A NETWORKING│
│   OR SOCIAL MEDIA DATABASE, FOR THE PARTICIPANTS OF THE     │
│                     TELECONFERENCE                          │
│                                                             │
│                           508                               │
└─────────────────────────────────────────────────────────────┘
                              ▼
┌─────────────────────────────────────────────────────────────┐
│  PRESENT, WITHIN THE PARTICIPANT INTERFACE ELEMENTS, THE    │
│                  SUPPLEMENTAL DATA                          │
│                                                             │
│                           510                               │
└─────────────────────────────────────────────────────────────┘
                              ▼
┌─────────────────────────────────────────────────────────────┐
│  RECEIVE, FROM A CLIENT DEVICE OF A PARTICIPANT IN THE FIRST│
│   SUBSET OF THE PARTICIPANT INTERFACE ELEMENTS, A PRIVACY   │
│     INDICATION TO MAKE THE FIRST CONVERSATION PRIVATE       │
│                                                             │
│                           512                               │
└─────────────────────────────────────────────────────────────┘
                              ▼
┌─────────────────────────────────────────────────────────────┐
│  BASED ON THE RECEIVING THE PRIVACY INDICATION, PREVENT     │
│  ADDITIONAL PARTICIPANTS FROM JOINING THE FIRST CONVERSATION│
│                                                             │
│                           514                               │
└─────────────────────────────────────────────────────────────┘
```

FIG. 25

SPATIAL AUDIO CONVERSATIONAL ANALYSIS FOR ENHANCED CONVERSATION DISCOVERY

CROSS-REFERENCE TO RELATED APPLICATION

This application is a divisional of U.S. patent application Ser. No. 17/357,891, filed Jun. 24, 2021, the content of which application is hereby expressly incorporated herein by reference in its entirety.

BACKGROUND

When in a teleconference, which may also include video in some instances, audio from unmuted participants is generally transmitted to all participants of the teleconference. The audio is also equally amplified for all the participants of the teleconference. This equal distribution of audio makes it almost impossible to have more than one person speaking at a time and be able to comprehend what is being said by the multiple speakers. Thus, there is little possible direct interactions between teleconference participants, and there is no ability to have smaller or warm up conversations. For instance, if a presenter at a virtual conference were to ask, "How was your weekend?," there is no clarity as to which participant is to answer or continue a conversation. In very large presentations or conferences, this drawback relegates side conversations to separate forms of communications, such as text-based messages in a chat feature. Effectively, current teleconference systems have turned the truly unique aspects of a conversation into nothing more than a broadcast of audio.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure provide for improved and enhanced teleconference technology. In some aspects, the present technology provides variable-volume audio for participants based on a user-controlled and/or a system-controlled location in a virtual room or interface. For instance, as a participant moves their respective interface element closer to another participant's interface element, the volume from the audio stream from that participant is increased, which simulates spatial audio. Thus, even in a virtual setting, participants may move closer to other participants to better hear what that participant has to say—effectively allowing for actual conversations to occur in a teleconferencing platform. Where a conference participant is presenting to the entire conference, that audio may be provided to all participants while still allowing for side conversations between other participants based on their relative positions within the virtual room. However, the audio streams from the non-presenting participants may not be provided to the presenter. Thus, the presenter is not distracted by side conversations from the participants, which is a significant improvement over in-person conferences.

In addition, the present technology also provides for supplemental content or data to be integrated into the teleconferencing interface. The supplemental data may include additional data regarding the conference participants that may be useful for others to know when deciding which conversations to join, which is yet another improvement over in-person conferences that is only possible with a virtual teleconferencing platform. As an example, social media or networking websites may be used as sources for the supplemental content. For instance, the degree of connection (e.g., $1^{st}$, $2^{nd}$, $3^{rd}$ connections in the LinkedIn networking platform), may be displayed in the teleconference interface to allow for discovery of known participants and/or conversations with participants that may be known to a particular user/participant.

The audio from specific conversations may also be analyzed to determine additional insights into the conversations between participants. For example, the audio for a conversation of participants may converted to text using speech-to-text technology. The text may then be analyzed to determine keywords or topics of the conversation. The topics or keywords may be displayed to users/participants such that the participants may see what is being discussed in other conversations to determine which conversation the user may wish to join. Sentiment (e.g., positive or negative attitudes) towards each of the topics or keywords may also be determined and displayed within the interface-providing further insights into which conversation a user may wish to join. The level of engagement from the participants in each conversation may also be detected and displayed in the teleconferencing interface.

Further, the text from the speech-to-text may also be analyzed to determine if teleconference participants names have been mentioned. For example, if a participant's name is mentioned in a conversation for which the participant is not a part, that participant may be notified and be provided with audio from the conversation. Similarly, if the participant's name is mentioned in the context of requesting the participant join the conversation, the participant may be notified of such a request as well.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 25 depicts another example method for providing enhanced teleconferencing.

DETAILED DESCRIPTION

Figure 1:
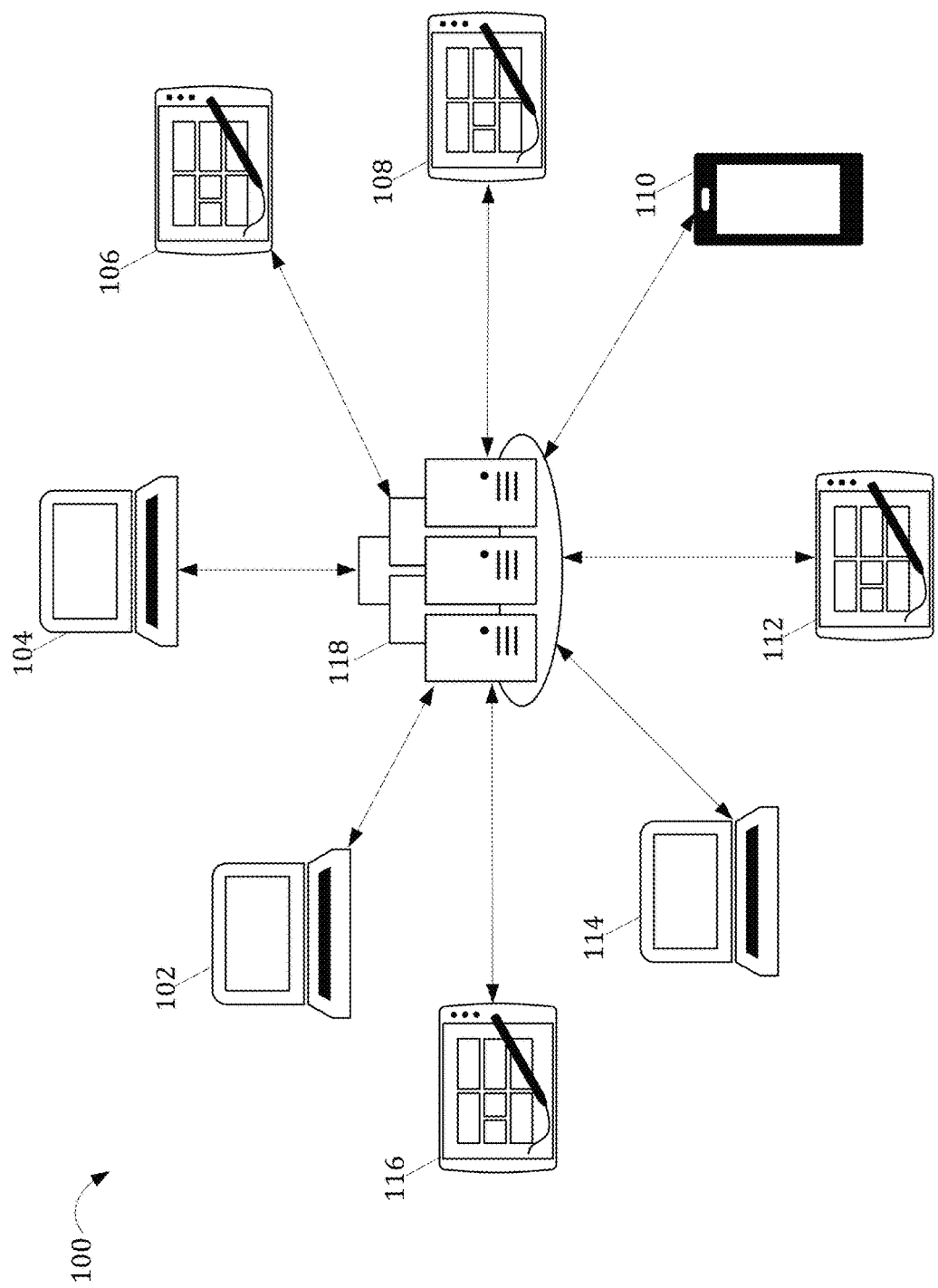
FIG. 1 illustrates an overview of an example system for teleconferencing.

The present disclosure describes systems and methods for improved teleconferencing systems. As discussed briefly above, modern teleconference systems provide equal distribution of audio to all participants of the conference. This prevents actual conversation between different participants of the conference. While breakout rooms have been introduced to help create smaller rooms of participants within the conference that allow for privacy, the breakout rooms remove the participants from the main conference and thus the audio from the main conference. Ultimately, current teleconferencing technology removes and prevents many of the benefits of in-person conferences. The present technology improves such teleconferencing technology to allow for such benefits to be realized in a virtual setting. Moreover, the present technology provides additional enhancements to the teleconferencing technology that provide features that are simply not possible in a physical in-person conference.

More specifically, in some aspects, the present technology provides variable-volume audio for participants based on a user-controlled and/or a system-controlled location in a virtual room or interface. For instance, as a participant moves their respective interface element closer to another participant's interface element in the teleconferencing interface, the volume from the audio stream from that participant is increased, which simulates spatial audio. Thus, even in a virtual setting, participants may move closer to other participants to better hear what that participant has to say—effectively allowing for actual conversations to occur in a teleconferencing platform. Where a conference participant is presenting to the entire conference, that audio may be provided to all participants while still allowing for side conversations between other participants based on their relative positions within the virtual room. However, the audio streams from the non-presenting participants may not be provided to the presenter even where the other participants are not "muted." Thus, the presenter is not distracted by side conversations from the participants, which is a significant improvement over in-person conferences.

In addition, the present technology also provides for supplemental content to be integrated into the teleconferencing interface. The supplemental content may include additional data regarding the conference participants that may be useful for others to know when deciding which conversations to join, which is yet another improvement over in-person conferences that is only possible with a virtual teleconferencing platform. As an example, social media or networking websites may be used as sources for the supplemental content. For instance, the degree of connection (e.g., $1^{st}$, $2^{nd}$, $3^{rd}$ connections in the LinkedIn networking platform), may be displayed in the teleconference interface to allow for discovery of known participants and/or conversations with participants that may be known to a particular user/participant.

The audio from specific conversations may also be analyzed to determine additional insights into the conversations between participants. For example, the audio for a conversation of participants may converted to text using speech-to-text technology. The text may then be analyzed to determine keywords or topics of the conversation. The topics or keywords may be displayed to users/participants such that the participants may see what is being discussed in other conversations to determine which conversation the user may wish to join. Sentiment (e.g., positive or negative attitudes) towards each of the topics or keywords may also be determined and displayed within the interface—providing further insights into which conversation a user may wish to join. The keywords can also be used as meeting summaries and entities for search engine queries. The level of engagement from the participants in each conversation may also be detected and displayed in the teleconferencing interface.

Further, the text from the speech-to-text conversion may also be analyzed to determine if teleconference participants names have been mentioned. For example, if a participant's name is mentioned in a conversation for which the participant is not a part, that participant may be notified and be provided with audio from the conversation. Similarly, if the participant's name is mentioned in the context of requesting the participant join the conversation, the participant may be notified of such a request as well.

FIG. 1 illustrates an overview of an example system 100 for teleconferencing. The system 100 may include a plurality of client devices 102-116 of participants of a teleconference. The client devices 102-116 may transmit audio streams and/or video streams, among other data, to and from one or more teleconference servers 118. For instance, while the term teleconference is used herein, such a usage should not imply that a teleconference is limited to audio only. Rather, as used herein, the term teleconference includes a virtual conference that includes audio and/or video from the participants of the conference. The teleconference servers 118 may combine and alter the audio streams and/or video streams received from the client device 102-116. For example, the teleconference servers 118 may alter the volume of the audio streams before providing the audio streams to client devices 102-116 of other participants of the teleconference, as discussed further herein. In some examples, the audio mixing and alteration of the audio streams may also be performed, at least in part, by the client devices 102-116 themselves. That is, some portion of the audio mixing may be performed locally and/or remotely from the perspective of a particular client device.

In addition to audio mixing, the teleconference servers 118 may also perform additional operations relating to the teleconference, including many of the options discussed herein. For example, the teleconference servers 118 may generate user interfaces and send such user interface data to the client devices 102-116. In some examples, the client devices 102-116 may generate portions of the user interface as well, such as where a teleconferencing application (e.g., the TEAMS application from the Microsoft Corporation of Redmond, Washington) is installed locally at the client devices 102-116. The teleconference servers 118 then provides updates to that user interface based on the ongoing activities of the teleconference.

The teleconference servers 118 (and/or the client devices 102-116) may also analyze the audio streams and/or video streams of the teleconference to determine additional details about what is being discussed during the teleconference. For instance, speech-to-text (e.g., speech recognition) technology may be utilized to convert the audio streams to text. Analysis of the text may be sued to identify topics or keywords that are being uttered or discussed during the conference. Analysis of the text may also indicate sentiment associated with the topics, engagement levels of the participants, and when a participant's name has been uttered, among other things. These additional identified data may be used as triggers to perform additional actions.

Figure 2:
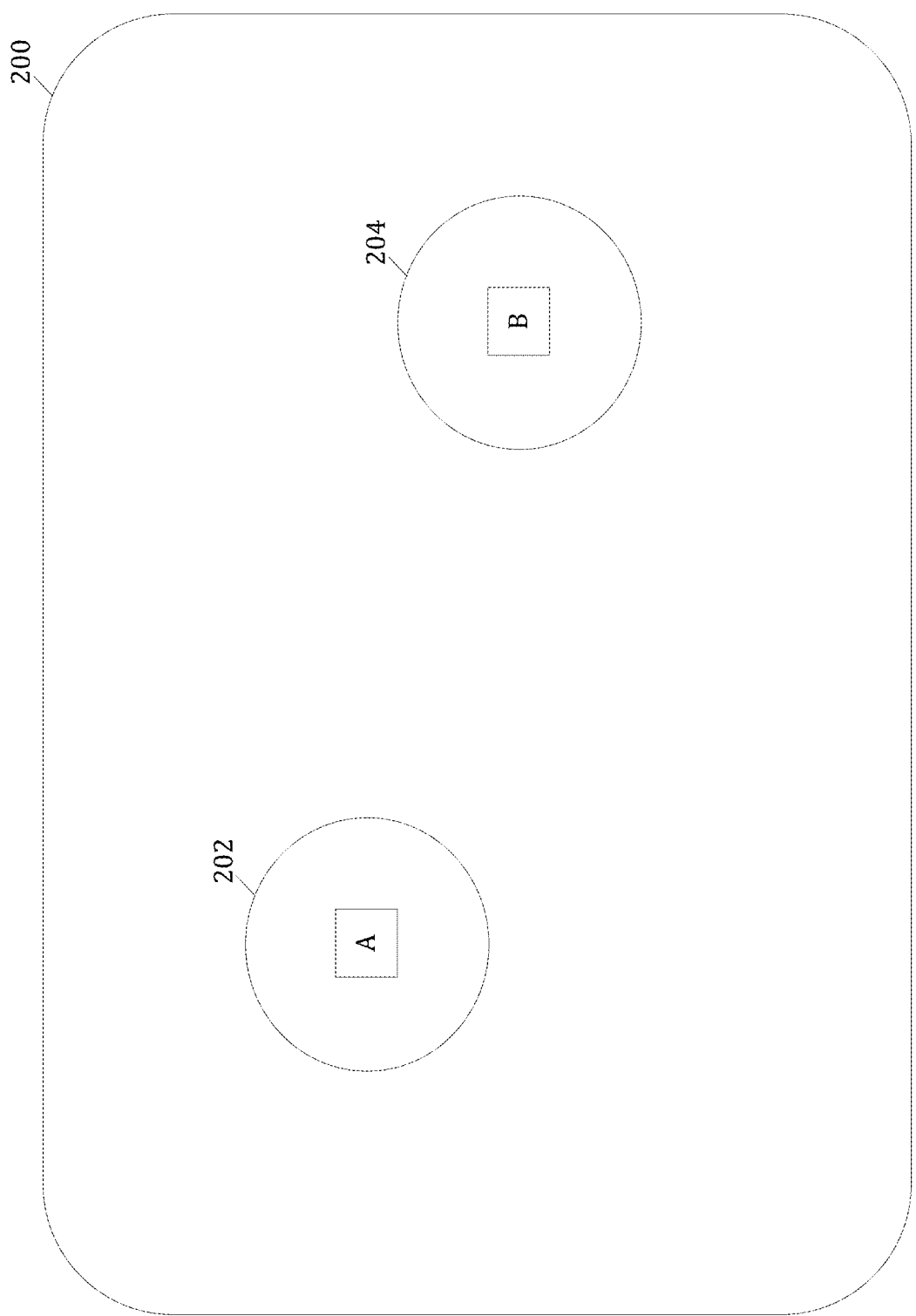
FIG. 2 depicts an example conferencing interface with two participant interface elements.

FIG. 2 depicts an example conferencing interface 200 with two participant interface elements. The conferencing or teleconferencing interface 200 may be displayed as part of a web-based teleconference view through a browser or a teleconference interface viewed through a locally installed application. In the interface 200, a first participant interface element 202 for a first participant (e.g., User A) of the teleconference is displayed. A second participant interface element 204 for a second participant (e.g., User B) of the teleconference is also displayed. The interface 200 may be considered as a virtual space, and the positions of each of the participant interface elements may be controlled by the respective users. For example, User A may control the position of the first participant interface element 202, and user B may control the position of the second participant interface element 204 within the interface 200. The position of one participant interface element relative to the position of another participant interface element may control how audio streams are exchanged between the client devices associated with the respective participant interface elements.

Each of the participant interface elements may include a boundary and a user identifier. For example, the first participant interface element 202 includes an outer boundary in the shape of a circle, and an "A" to associate the first participant interface element 202 with the User A. While a circle is depicted, other shapes and configurations of the boundary may also be used. In addition, the user identifier may be a name, image, video feed or other identifier that identifies the user of the particular participant interface element.

In the scenario depicted in FIG. 2, User A and User B have joined the teleconference, but they are not yet in communication with one another because the first participant interface element 202 is not positioned proximate the first participant interface element 202. As briefly discussed above, in some examples, the position of the first participant interface element 202 relative to the second participant interface element 204 may control whether and how audio is exchanged between the client devices associated with the first participant interface element 202 and the second participant interface element 204. In an example, audio may not be exchanged between User A and User B unless the distance between the first participant interface element 202 and the second participant interface element 204 is below a distance threshold. In another example, audio may not be exchanged between User A and User B unless the boundary of first participant interface element 202 overlaps the boundary of the second participant interface element 204. In still other examples, audio may be exchanged between User A and User B no matter the relative positions of the first participant interface element 202 and the second participant interface element 204, but the volume of the exchanged audio is altered based on the distance between the first participant interface element 202 and the second participant interface element 204. For example, as User A moves the first participant interface element 202 further away from the second participant interface element 204, the volume of the audio stream from User B is reduced proportional to the change in distance between the first participant interface element 202 and the second participant interface element 204.

Figure 3:
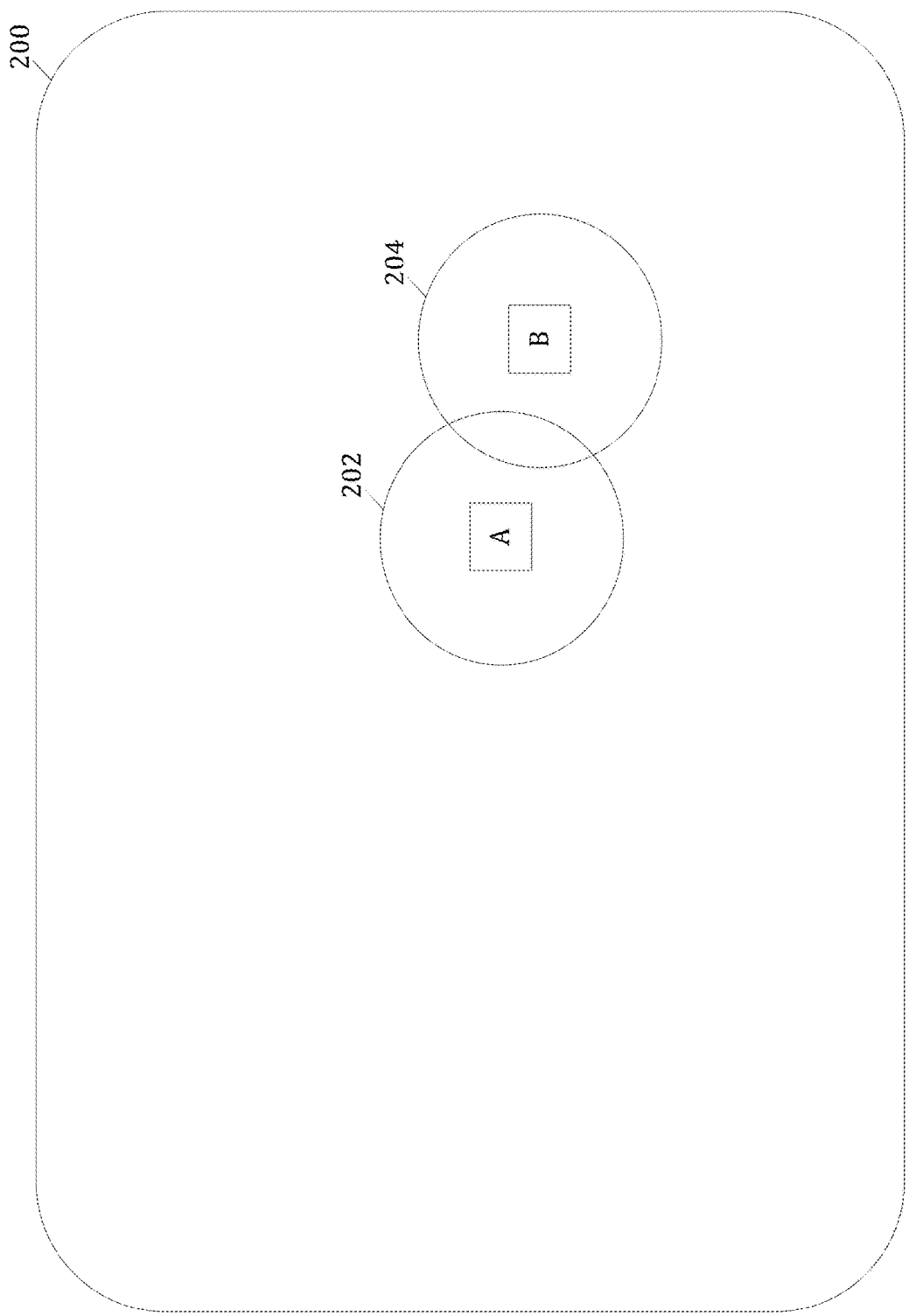
FIG. 3 depicts the example conferencing interface with two participant interface elements for participants in a conversation.

FIG. 3 depicts the example conferencing interface 200 with two participant interface elements for participants in a conversation. In the scenario in FIG. 3, the first participant interface element 202 and the second participant interface element 204 are proximate one another, and the boundaries of the first participant interface element 202 and the second participant interface element 204 overlap one another. Based on the positions of the first participant interface element 202 and the second participant interface element 204, a conversation between User A and User B may be identified. The conversation may be formed by the User A changing the position of the first participant interface element 202 to overlap the second participant interface element 204, such as by dragging the first participant interface element 202 across the interface 200. When the first participant interface element 202 and the second participant interface element 204 are in proximity with one another, as shown in FIG. 3, audio streams from the client device of User A and the client device of User B may be exchanged to facilitate the conversation between User A and User B.

Figure 4:
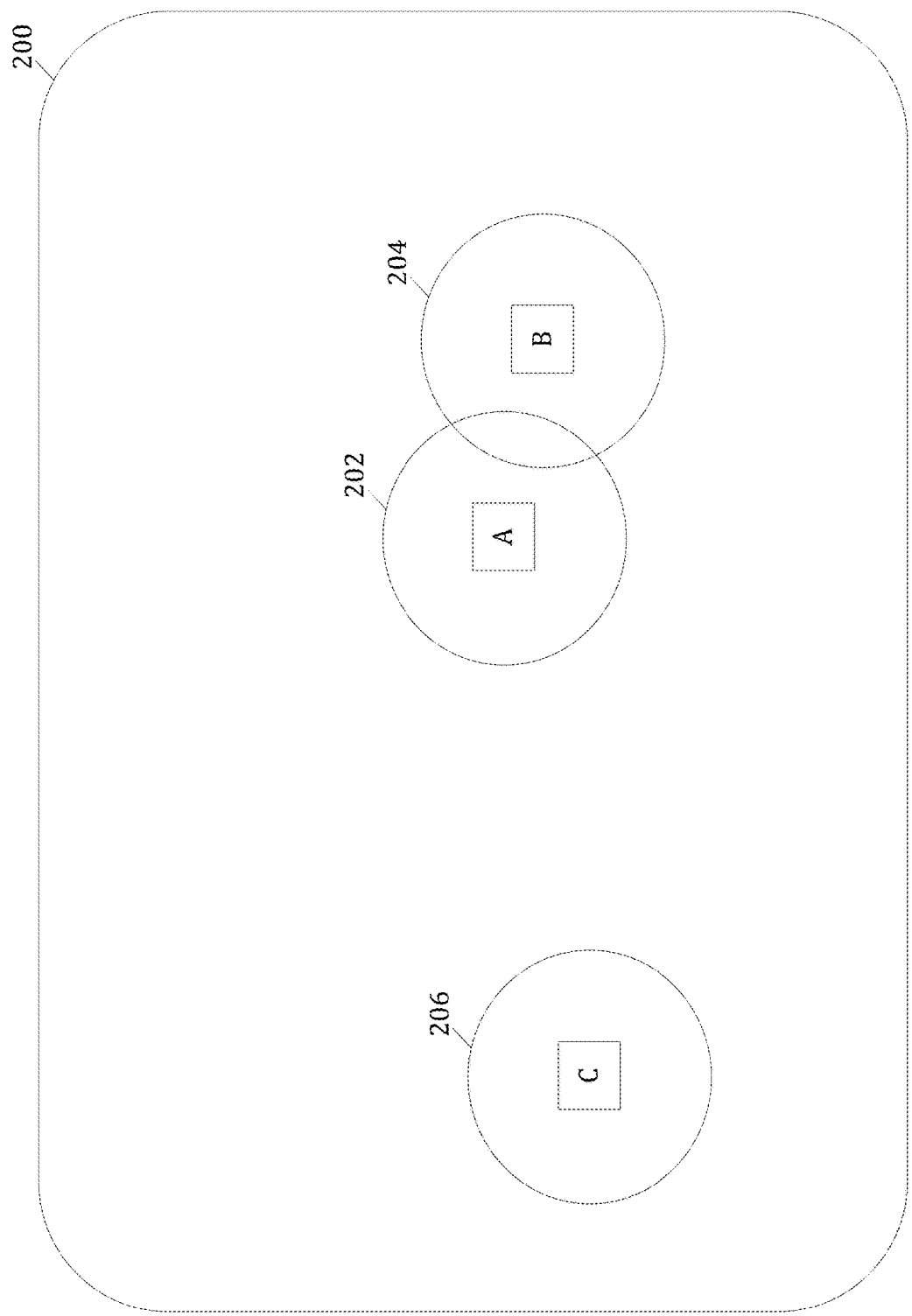
FIG. 4 depicts the example conferencing interface with a new participant.

FIG. 4 depicts the example conferencing interface 200 with a new participant, User C. When User C joins the teleconference, a third participant interface element 206 is displayed in the interface 200. The third participant interface element 206 may be placed apart from the first participant interface element 202 and the second participant interface element 204 because User C has not yet joined a conversation. Because the third participant interface element 206 is not positioned proximate the first participant interface element 202 and the second participant interface element 204, User C is not provided with audio from User A and User B. Similarly, Users A and B are not provided with audio from User C.

Figure 5:
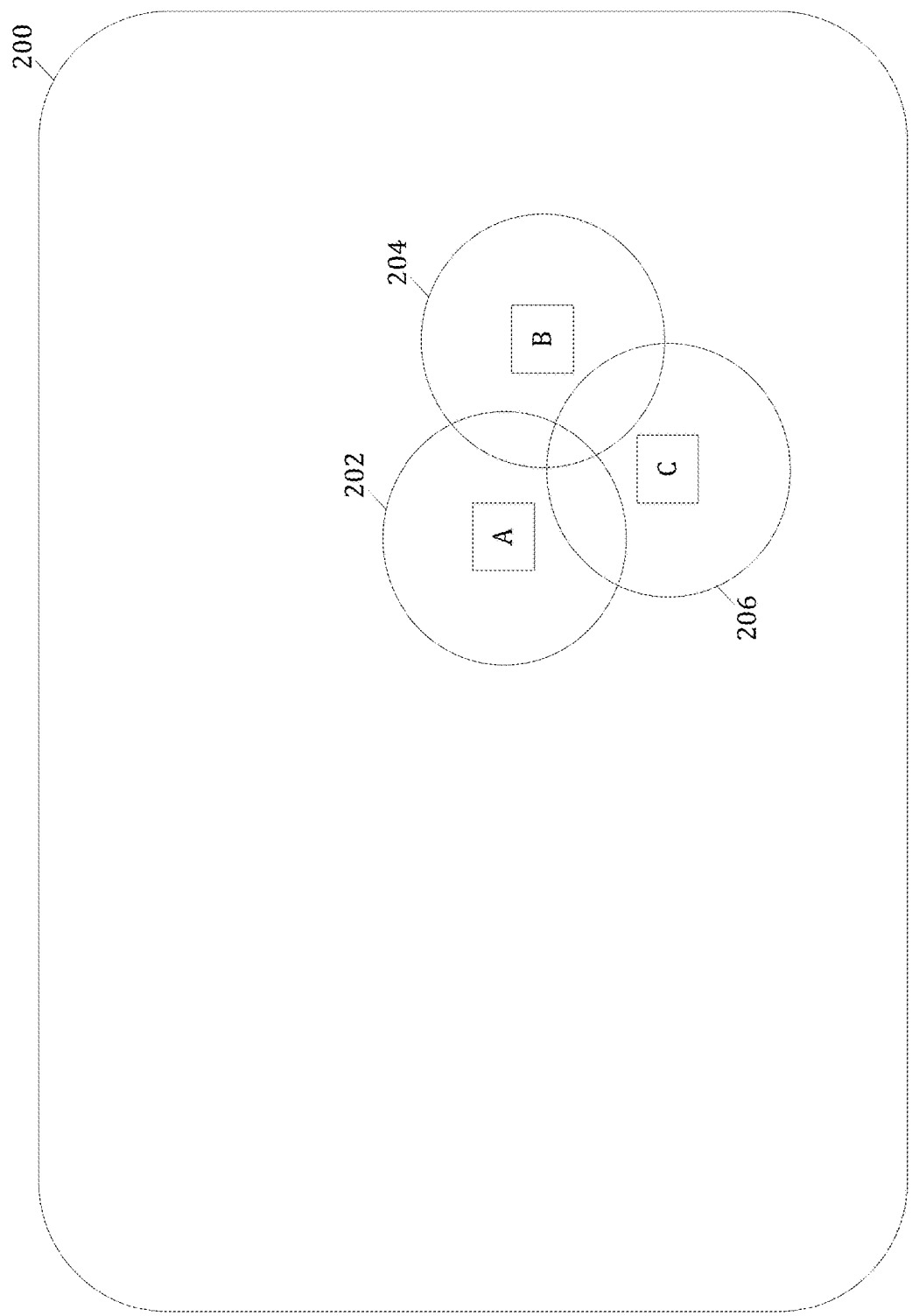
FIG. 5 depicts the example conferencing interface with the new participant joining the conversation.

FIG. 5 depicts the example conferencing interface 200 with the new participant, User C, joining the conversation. User C may, by interacting with User C's client device, adjust the position of the third participant interface element 206 such that the third participant interface element 206 overlaps with the first participant interface element 202 and the second participant interface element 204. Once the third participant interface element 206 is positioned in such a manner, audio may be exchanged between the client devices of User A, User B, and User C to facilitate a conversation between User A, User B, and User C. Once the conversation has been established, the volume of each of the audio streams may be altered based on the relative positions of the first participant interface element 202, the second participant interface element 204, and the third participant interface element 206. In some examples, however, a user may move his or her participant interface element slightly closer to or further from another participant user interface element to remain in the conversation but increase or reduce the volume from another user.

Figure 6:
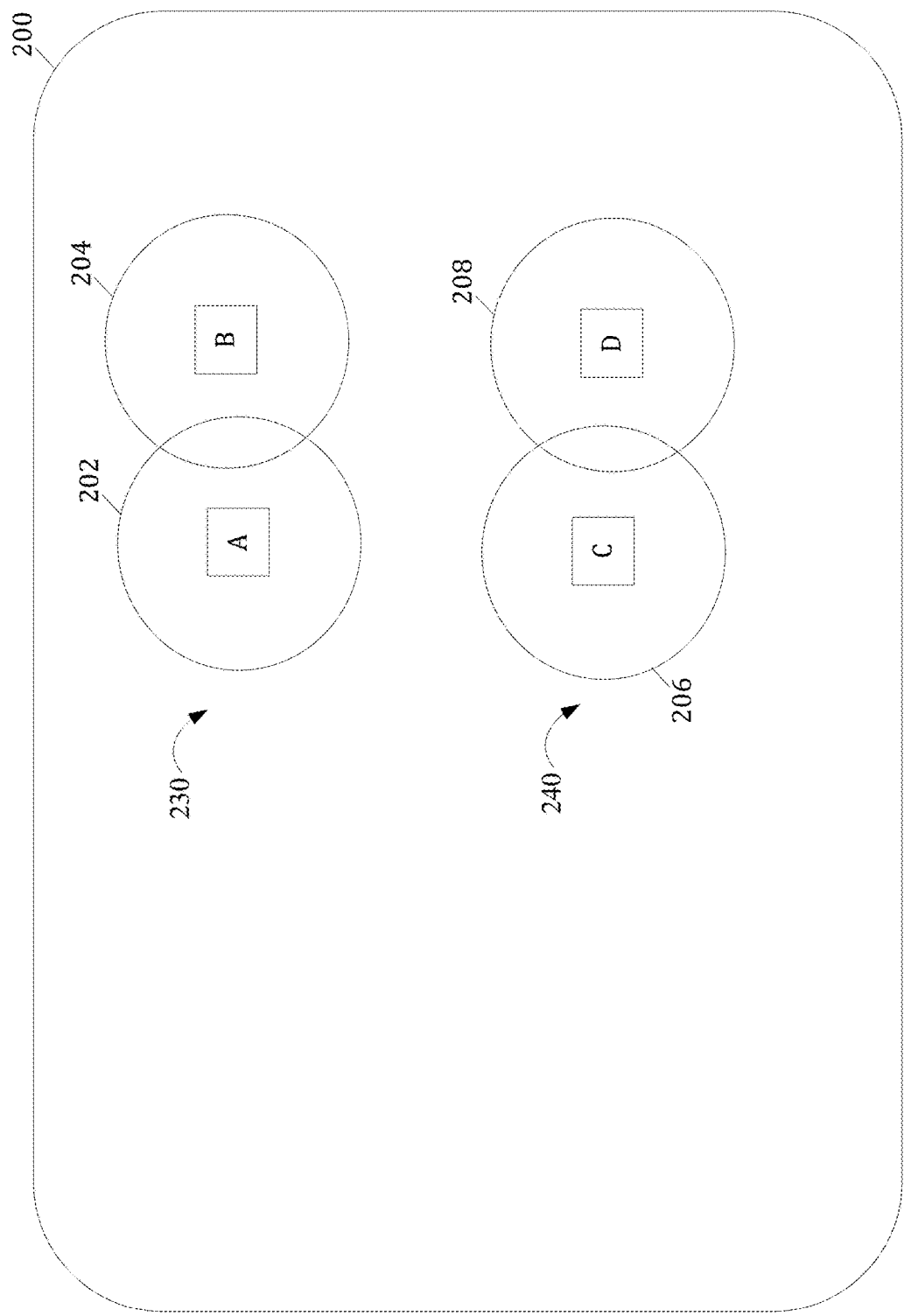
FIG. 6 depicts the example conferencing interface with two conversations.

FIG. 6 depicts the example conferencing interface 200 with two conversations. Another user (User D) has joined the teleconference, and a fourth participant interface element 208 is displayed corresponding to User D. In the scenario depicted, User C has left the conversation 230 with Users A and B, as indicated by the third participant interface element 206 no longer being in proximity with the first participant interface element 202 and the second participant interface element 204. Users C and D, however, have started a new conversation 240 as indicated by the third participant interface element 206 and the fourth participant interface element 208 being in proximity with one another. In such scenarios where multiple conversations are formed within the teleconference, audio may be exchanged with the participants that are a part of the respective conversation. For example, audio is exchanged between Users A and B because Users A and B are part of a first conversation 230, but the audio from Users A and B is not provided to Users C and D because Users C and D are not part of the first conversation. Similarly, audio is exchanged between Users C and D because Users C and D are part of a second conversation 240, but the audio from Users C and D is not provided to Users A and B because Users A and B are not part of the second conversation.

Distinctions between conversations may be identified in a variety of different manners. For example, all users having participant interface elements within a threshold distance of one another may be considered to be part of the same conversation. In other examples, segments of the interface 200 may be designated for different conversations. For example, all participant interface elements in the lower-right hand quadrant of the interface 200 may be considered to be in one conversation, and all participant interface elements in the upper-right hand quadrant of the interface may be considered to be in another conversation.

Figure 7:
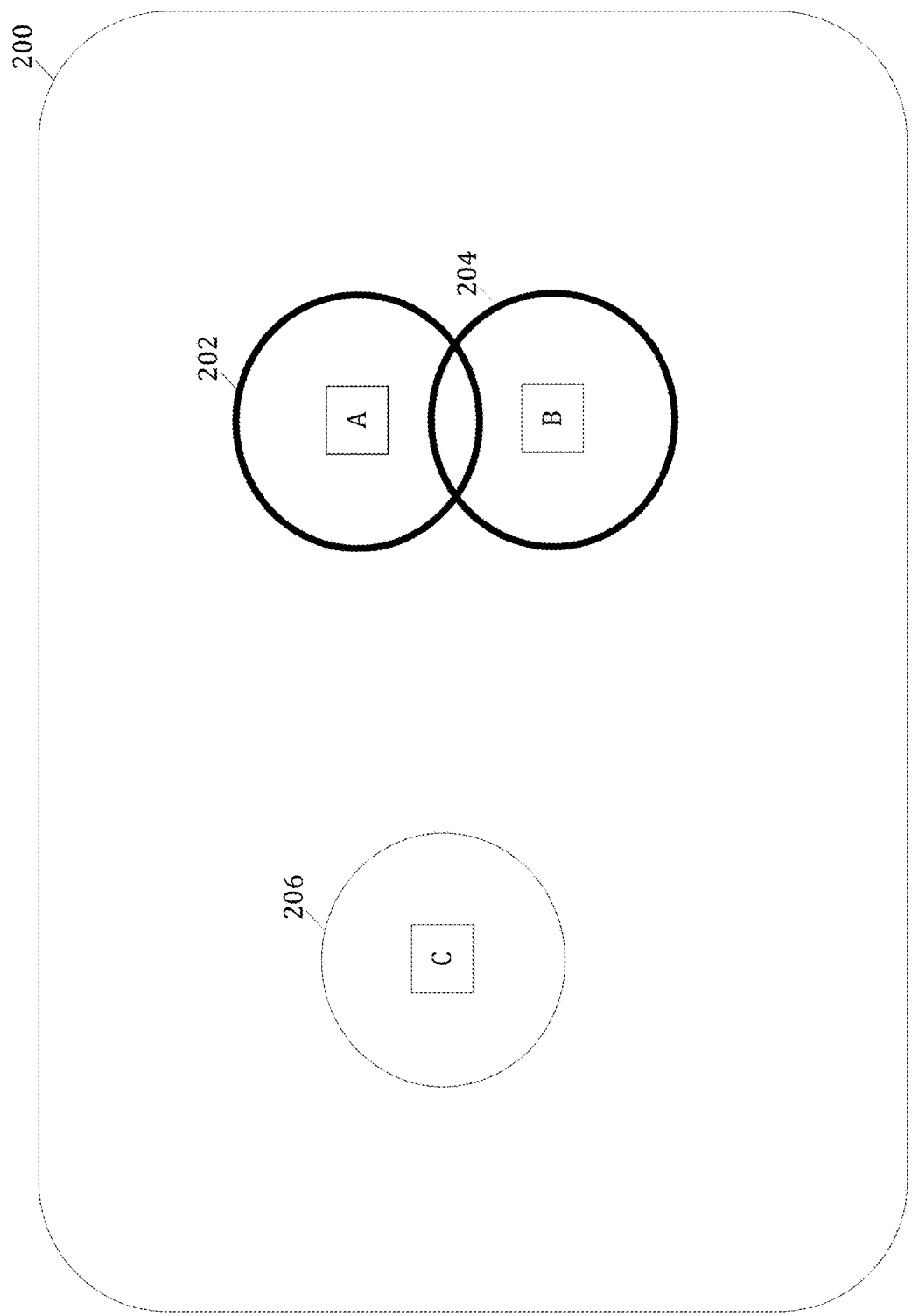
FIG. 7 depicts the example conferencing interface with participant interface elements indicating a private conversation.

FIG. 7 depicts the example conferencing interface 200 with participant interface elements indicating a private conversation. In the depicted scenario, Users A and B are in a conversation due to the positions of the first participant interface element 202 and the second participant interface element 204. Either User A or User B may have the option to indicate that the conversation should remain private and other users should be prevented from joining. For example, a toggle switch or other user interface element may be displayed in the interface 200 to allow for a selection of a private conversation or a privacy mode. Once selected by a participant of a conversation, the conversation may be marked private and additional participants may be prevented from joining the conversation.

The participant interface elements of the conversation may be altered or updated to indicate that the conversation has been marked private. For example, the boundaries of the first participant interface element 202 and the second participant interface element 204 may be altered to indicate that the conversation is private. The change to the first participant interface element 202 and the second participant interface element 204 may include changing the color, format, or visibility of the participant interface elements. For example, the boundaries may be changed to red, made bold or thicker, or any other type of change to indicate that the conversation is private. Other types of indicators to indicate that a conversation between participants is private may also be displayed, such as a ring around the first participant interface element 202 and the second participant interface element 204.

Because the conversation between Users A and B has been marked private, User C is prevented from moving the third participant interface element 206 proximate or overlapping with the first participant interface element 202 and the second participant interface element 204. Thus, User C cannot join the conversation between Users A and B.

Figure 8:
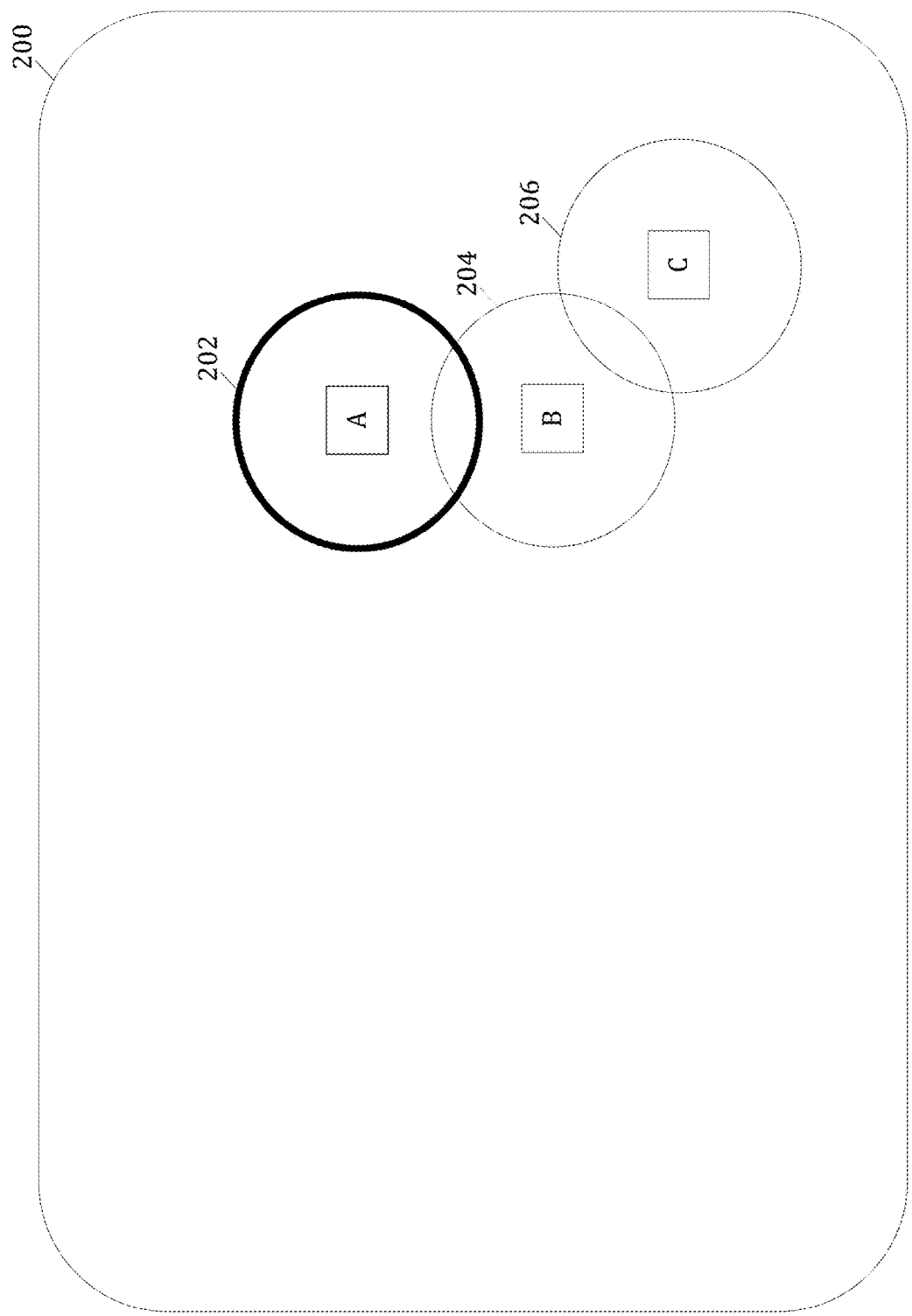
FIG. 8 depicts the example conferencing interface with one participant of a conversation indicating a private preference.

FIG. 8 depicts the example conferencing interface 200 with one participant of a conversation indicating a private preference. In some examples, one participant of a conversation may indicate that he or she would like their audio to remain private with some participants of the conversation but not prevent others from joining the overall conversation. Such a scenario is depicted in FIG. 8, where User A has indicated a private preference as indicated by the altered boundary of the first participant interface element 202. User A has indicated the private preference after joining a conversation with User B. Where the private indication is specific to User A rather than the conversation between User A and B, User C is still allowed to join a conversation with User B, but User C will not be provided with audio from User A. In some examples, User A will also not be able to hear the audio from User C because the third participant interface element 206 is not in proximity or overlapping with the first participant interface element 202.

Figure 9:
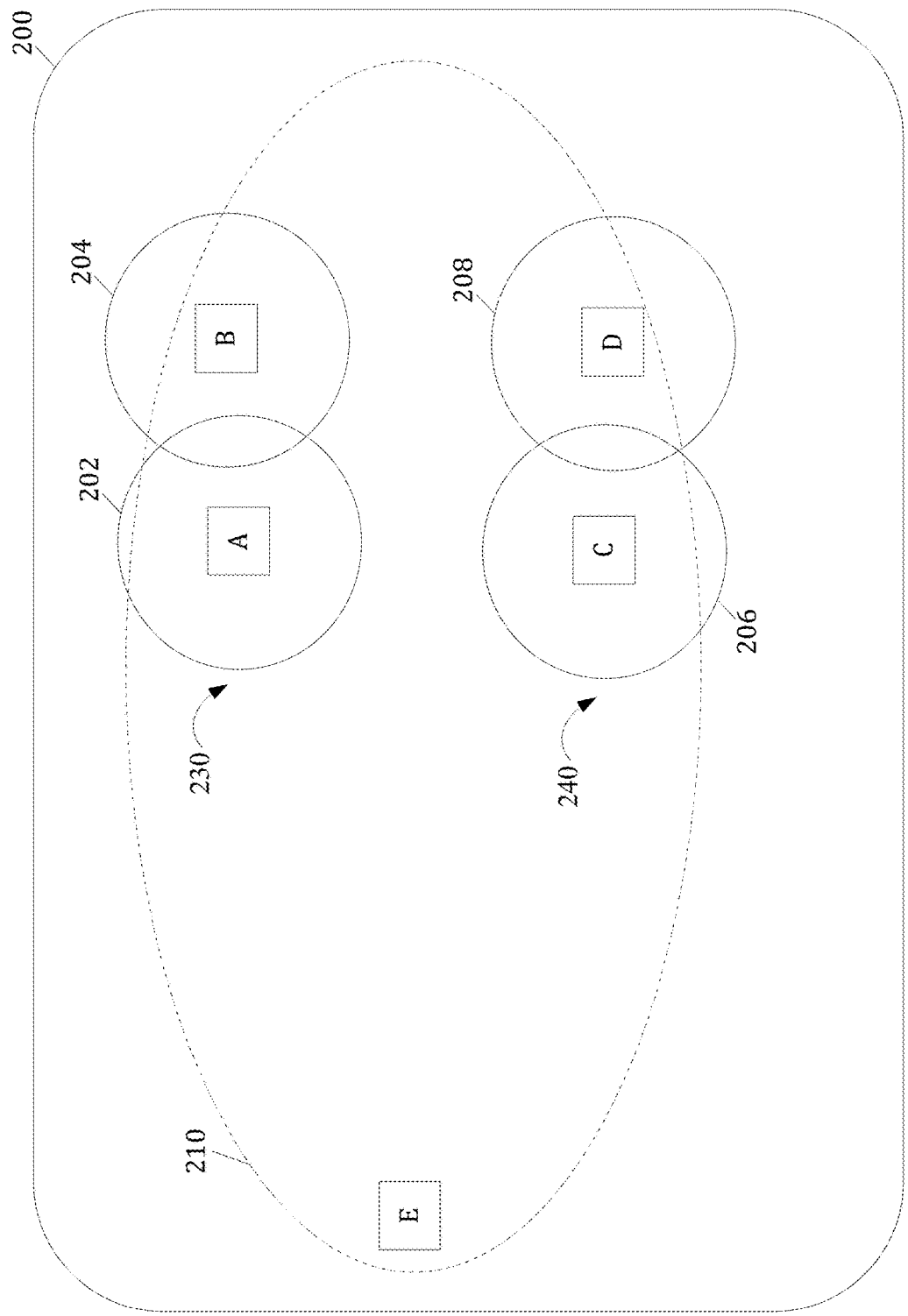
FIG. 9 depicts the example conferencing interface with a presenter.

FIG. 9 depicts the example conferencing interface 200 with a presenter. In the scenario depicted in FIG. 9, a new participant (User E) has joined the teleconference and has a presenter status. The presenter status may be selected by a user interface element. In other examples, the presenter status may be assigned, such as by an organizer of a teleconference.

A fifth participant interface element 210 is displayed in the interface 200. Because User E has a presenter status, the fifth participant interface element 210 has a different format than the other participant interface element. The participant interface element of a presenter may also be referred to as a presenter interface element 210. The fifth participant interface element 210 still includes an identifier that identifies the corresponding User E. The boundary of the fifth participant interface element 210 is larger than the other participant interface elements and the boundary may have a different format (color, thickness, dashing etc.) to indicate that the User E is a presenter.

All users having participant interface elements that have overlapping boundaries with the presenter participant interface element 210 receive audio from the presenter (i.e., User E in this example). Accordingly, Users A, B, C, and D all receive the audio from User E because the first participant interface element 202, the second participant interface element 204, the third participant interface element 206, and the fourth participant interface element 208 have overlapping boundaries with the fifth participant interface element 210.

However, the presenter does not receive audio from the other participants (unless another participant is asking a question, as discussed further below with reference to FIG. 10), which helps prevent the presenter from being distracted by side conversations of the teleconference. For instance, Users A and B are in a first conversation 230 with one another, and Users B and C are in a second conversation 240 with one another. User A is thus provided with audio from User B and User E, but not Users C and D. Similarly, User C is provided with audio from User D and User E, but not Users A and B, and the presenter, User E, does not hear audio from users A,B,C, or D.

Figure 10:
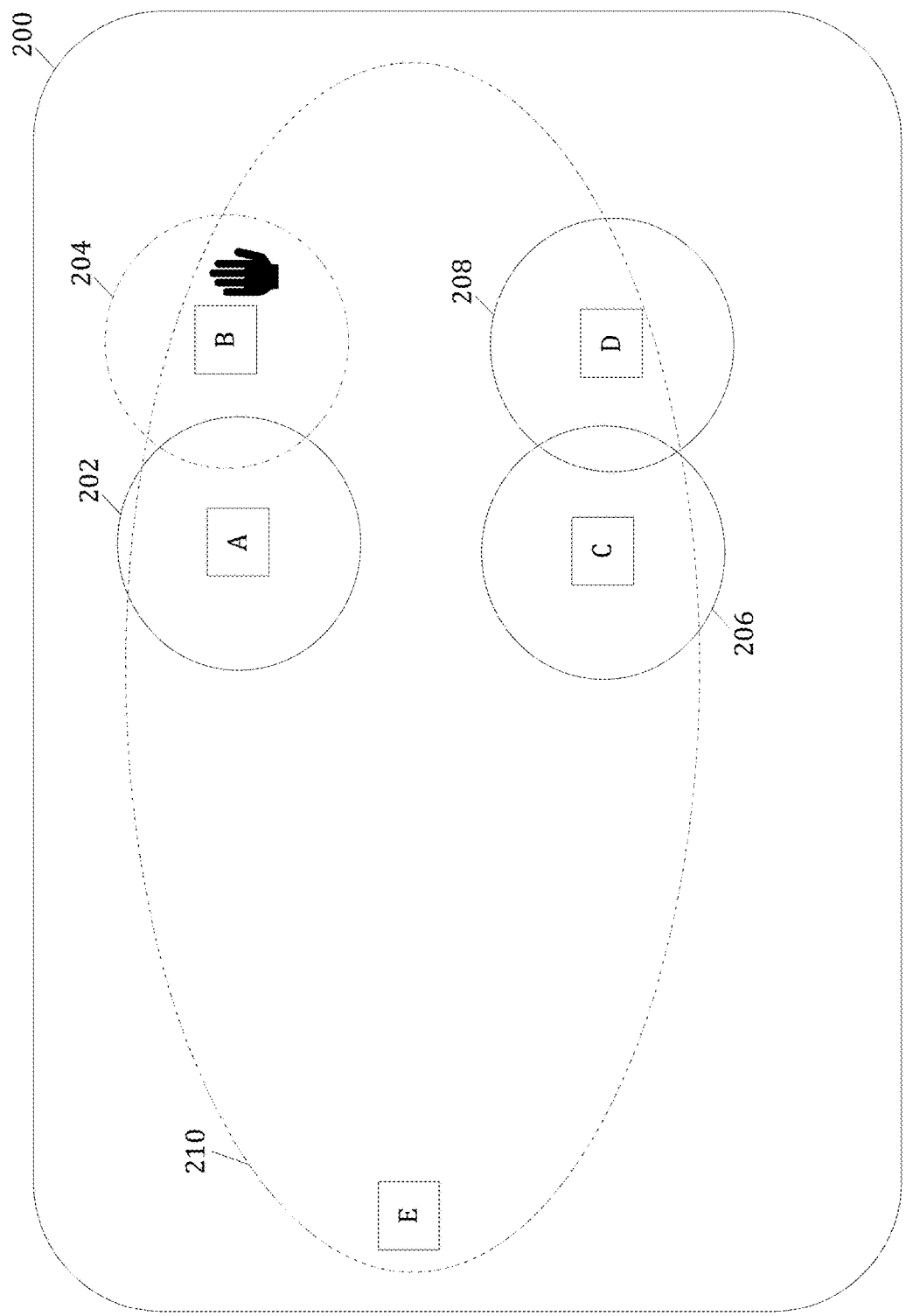
FIG. 10 depicts the example conferencing interface with the presenter and a participant with a question.

FIG. 10 depicts the example conferencing interface 200 with the presenter and a participant with a question. FIG. 10 depicts a scenario similar to FIG. 9 in that User E has a presenter status. In FIG. 10, however, User B has a question. User B may indicate that he or she has a question by selecting a user interface element indicating a question, such as a "raise hand" user interface element. Based on receiving a selection of the "raise hand" user interface element from User B, the display of the second participant interface element 204 is updated to indicate that User B has a question. Updating the second participant interface element 204 may include displaying a hand indicator, changing the boundary (e.g., color, line thickness, etc.), or any other change to indicate a question.

When a user has a question status (e.g., selected the question element), the audio from the user may be provided to all the other participants of the teleconference, including the presenter. In some examples, the audio is provided only to the presenter and the participants having participant interface elements with boundaries overlapping with the boundary of the presenter interface element. In addition, the audio from the questioning user may not be provided to other participants until the presenter allows, such as by acknowledging the presence of the question (e.g., by selecting an acknowledgement user interface element and/or selecting the participant interface element of the user with the question).

Using the example depicted in FIG. 10, because User B has the question status (and, optionally, has been recognized by the presenter), audio from User B is provided to User A, User C, User D, and User E. Thus, all the participants and the presenter are able to hear the question from User B.

Figure 11:
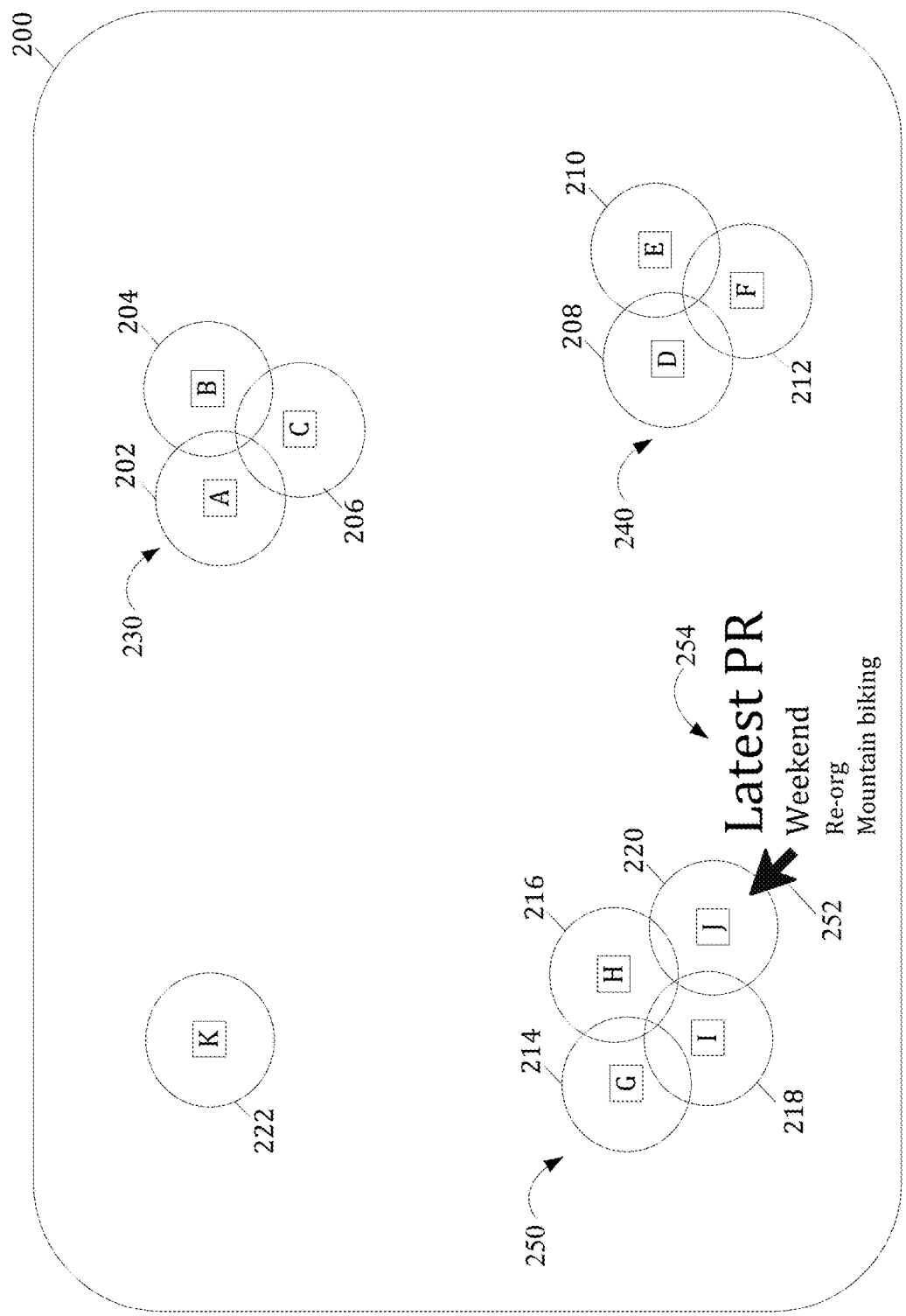
FIG. 11 depicts the example conferencing interface indicating discussed topics in a conversation.

FIG. 11 depicts the example conferencing interface 200 indicating discussed topics in a conversation. In this scenario, the conferencing interface 200 is being presented through a client device of a new user (User K) to the teleconference as indicated by an eleventh participant interface element 222. User K has joined the teleconference and can see the other participants of the conference and the various conversations that have formed. In the example depicted, a first conversation 230 has formed between Users A, B, and C as indicated by the cluster of first participant interface element 202, second participant interface element 204, and third participant interface element 206. A second conversation 240 has formed between Users D, E, and F, as indicated by the cluster of fourth participant interface element 208, fifth participant interface element 210, and sixth participant interface element 212. A third conversation 250 has formed between Users G, H, I, and J, as indicated by the cluster of seventh participant interface element 214, eighth participant interface element 216, ninth participant interface element 218, and tenth participant interface element 220. Due to all the different conversations occurring, User K may not know which conversation may be the best conversation to join.

The present technology may analyze the audio streams of the various conversation to determine topics or keywords of the conversation. Those keywords or topics may be displayed near the respective conversation to help a new user understand what is being discussed in each of the conversations. For example, a user (e.g., User K) may select a conversation (e.g., by moving a pointer 252 to the conversation and clicking or hovering), and the topics 254 for the conversation may be displayed. The topics 254 may be displayed in a variety of manners, including as a word cloud as depicted in FIG. 10. Each topic may be formatted according to its frequency or importance of use in the conversation or based on the interests of the user. For example, the topics that are used more frequently during the conversation may be displayed in a more dominant format (e.g., bold, larger size, higher ranking, etc.) than other topics. In FIG. 10, the topics 254 for the third conversation 250 include Latest PR, Weekend, Re-org, and Mountain biking. Because Latest PR is a more frequent or important topic in the conversation 250 than Re-Org, Latest PR is shown in a higher rank and in a larger font.

To determine the topics for the conversations, the audio streams of the conversations may be analyzed using speech recognition (e.g., speech-to-text algorithms). The text may then be analyzed to determine the most frequent or important keywords from the text. Algorithms such as term frequency-inverse document frequency (tf-idf) may be used to determine the important keywords. The tf-idf algorithm provides a numerical statistic that reflects how important a keyword is to the text. Machine-learning (ML) or artificial intelligence (AI) algorithms may also be used to identify the keywords, key phrase, or entities. For instance, the Text Analytics text-mining AI service from Microsoft Azure's Cognitive Services may be used to mine such insights using natural language processing (NLP) in unstructured text. Those identified keywords or key phrases may be used as the topics for the conversation.

The body of text that is analyzed to determine the topics (and other aspects discussed herein) continues to change as the participants of the conversation continue to talk. In some examples, the body of text may continue to grow as the conversation continues. In other examples, the audio of a conversation may be captured in a moving window, and thus the body of text will also continue to change. For example, the last 5 minutes, 10 minutes, 20 minutes, etc. of a conversation may be used for analysis. In any case, the body of text may be analyzed continuously, or at intervals, such that the topics for a conversation may change as the body of text that is analyzed changes.

In some examples, audio snippets may be made available for one or more of the topics. For example, for the topics 254 for the third conversation 250 in FIG. 11, audio snippets relating to each of the topics may be at least temporarily stored and made available to other users, such as User K. To access the audio snippets, User K may select one of the topics 254 from the interface 200. Based on the selection, an audio (and/or video snippet) may be played for User K so that User K can have additional context for the selected topic. The audio and/or video snippets may be based on time stamps associated with the body of text generated from the speech recognition of the audio. For instance, when the audio is converted to text, time stamps may be included in the text file such a corresponding time in the audio may for a textual word may be identified.

Figure 12:
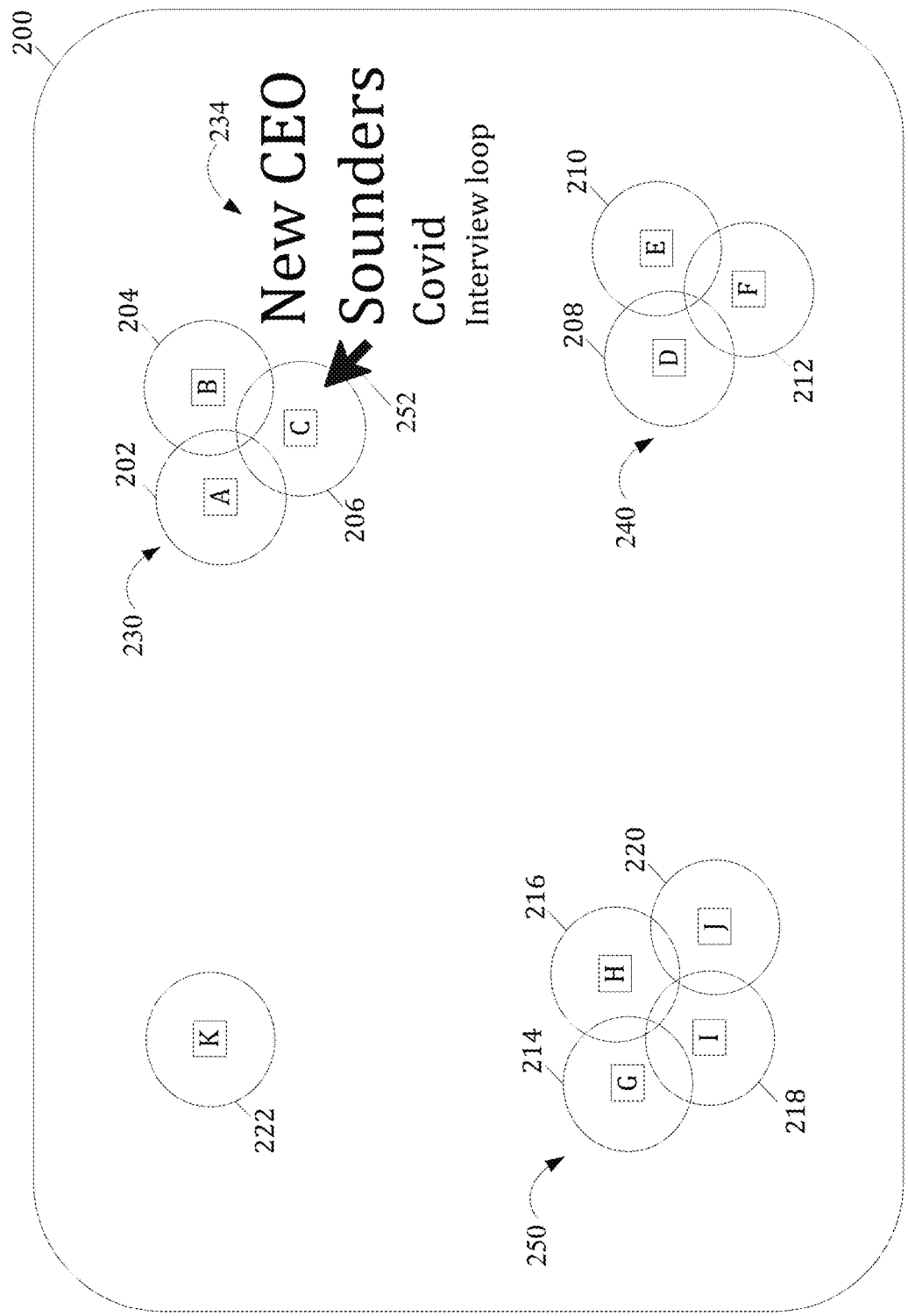
FIG. 12 depicts the example conferencing interface indicating discussed topics in another conversation.

FIG. 12 depicts the example conferencing interface 200 indicating discussed topics in another conversation. Similar to the interface 200 in FIG. 11, the User K may be continuing to explore or investigate the ongoing conversations in the teleconference. In FIG. 12, User K has selected the first conversation 230 by moving the pointer 252 to a participant interface element in the first conversation 230. As a result, topics 234 for the first conversation 230 are displayed. The topics 234 for the first conversation may be generated in a similar manner as the topics 254 for the third conversation. By exploring the topics of the different conversations, the User K may more appropriately determine which conversation (if any) to join.

Figure 13:
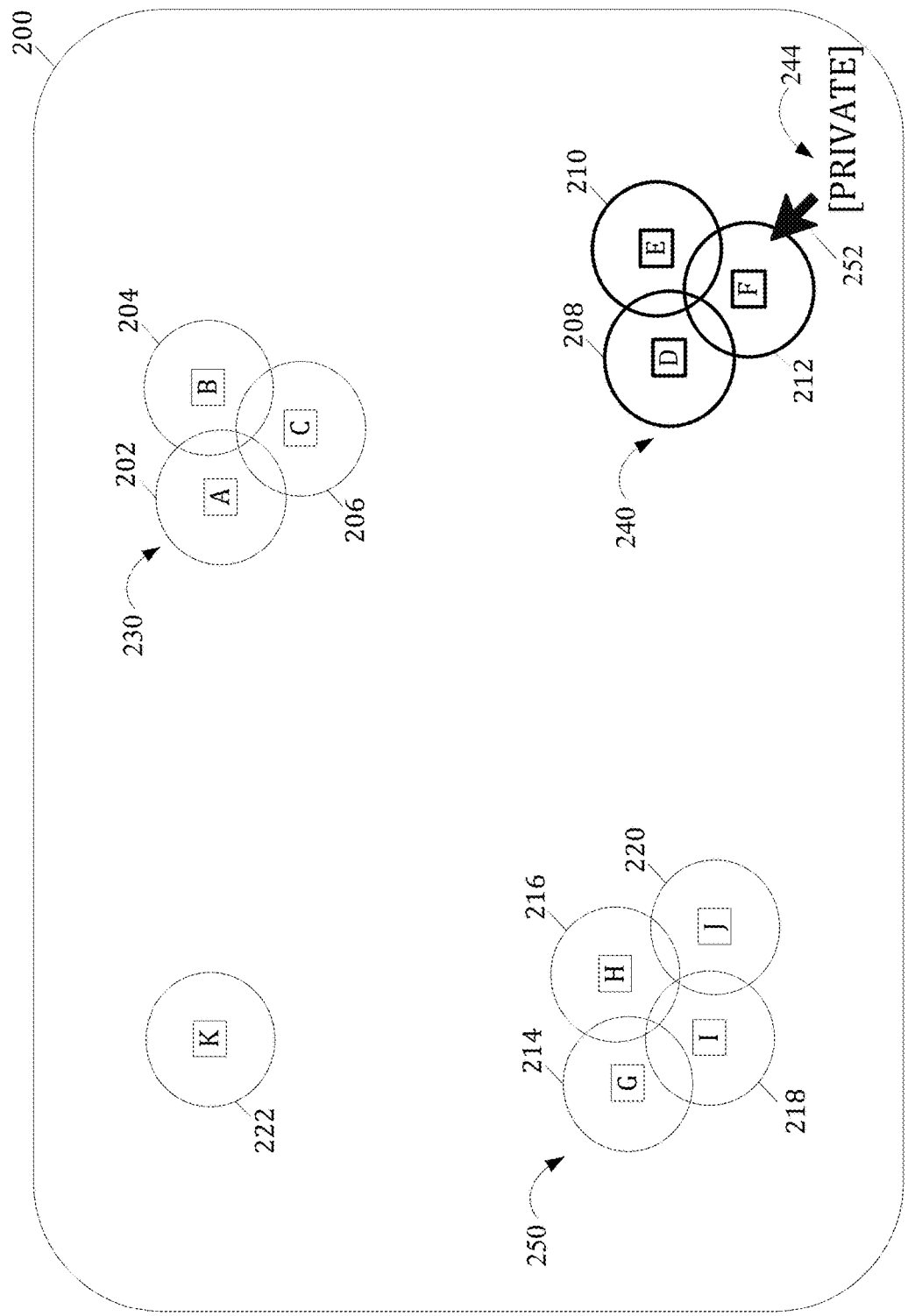
FIG. 13 depicts the example conferencing interface indicating a privacy preference preventing topic insights.

FIG. 13 depicts the example conferencing interface 200 indicating a privacy preference preventing topic insights. Continuing with the examples of FIGS. 11 and 12, in FIG. 13, User K has navigated the pointer to the second conversation. The second conversation 240, however, has been marked private. Accordingly, when the User K selects the second conversation 240, topics are not generated for the second conversation 240 and a private indicator may be displayed adjacent the second conversation to indicate topics cannot be generated because the conversation has been marked private. Marking the conversation private may also prevent the audio streams from being used for speech recognition and/or for topics to be determined in the first place. In other examples, the topics for the private conversation may still be determined, but the topics are not displayed to users that are not a part of the private conversation.

Figure 14:
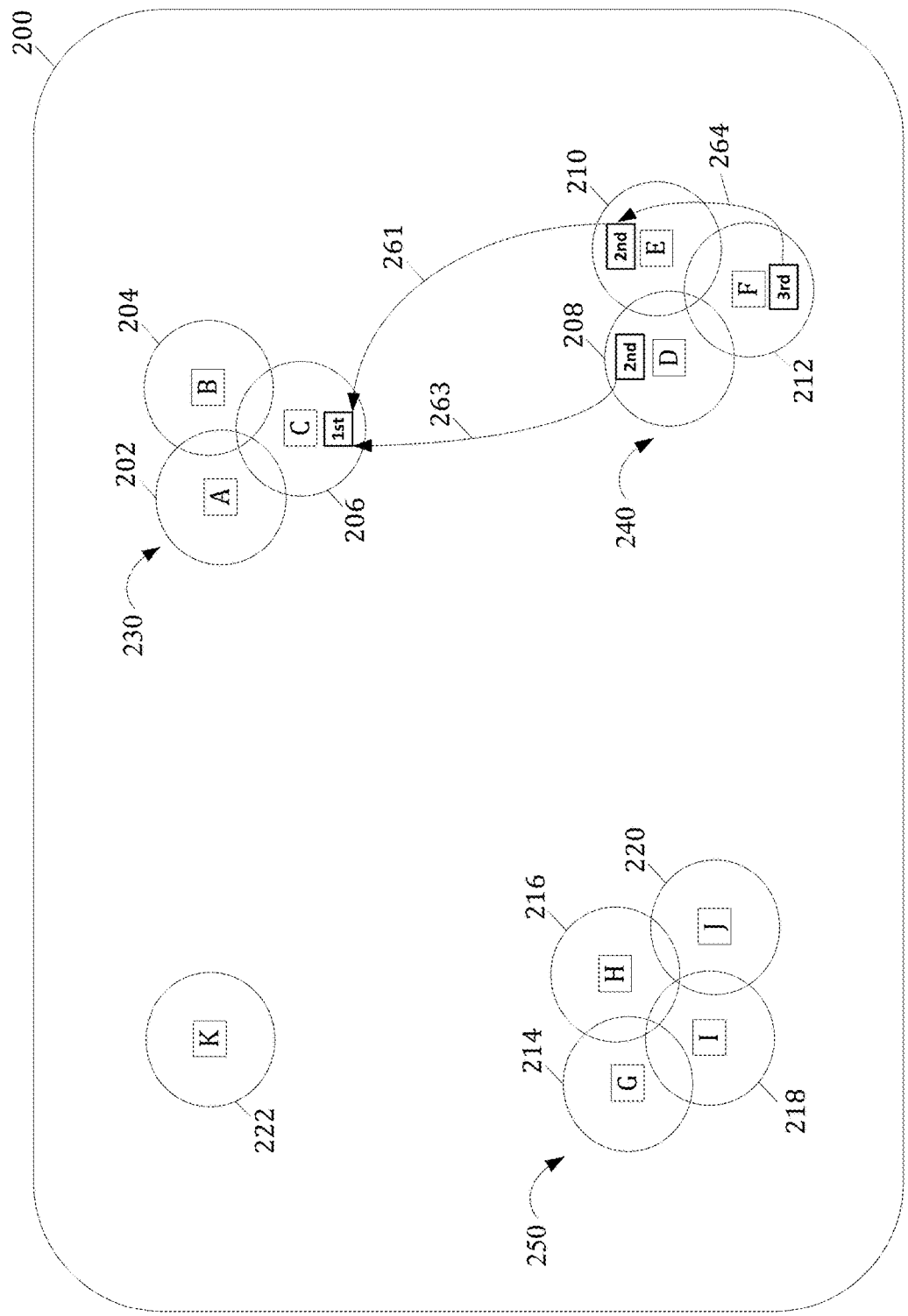
FIG. 14 depicts the example conferencing interface indicating connections between participants.

FIG. 14 depicts the example conferencing interface 200 indicating connections between participants. In some examples, the present technology may access supplemental information or data about participants of the teleconference. Such supplemental data may be accessed from a database of a networking, communication graph, or social media site, such as the LinkedIn networking site. For example, in FIG. 14, the supplemental data may include degrees of connection in the networking site between the participants. The supplemental data may be displayed in a variety of manners. In FIG. 14, connection indicators (e.g., first, second third) may be displayed within the participant interface elements. The connection indicators may indicate a degree of connection to the user that is currently viewing the interface 200. For instance, if the interface 200 is being displayed to User K, the connection indicators indicate the degree of connection to User K. In the example depicted, User C is a first-degree connection to User K, Users D and E are second-degree connections to User K, and User F is a third-degree connection. Arrows 261, 263, 264 may be drawn between the user interface elements based on the degrees of connection. For instance, User D is a second-degree to User K by way of User C. As such, an arrow 263 is presented showing the connection between User C and User D. Similarly, User F is a third-degree connection but is a connection of User E. Thus, an arrow 264 is presented between User E and a User F.

Figure 15:
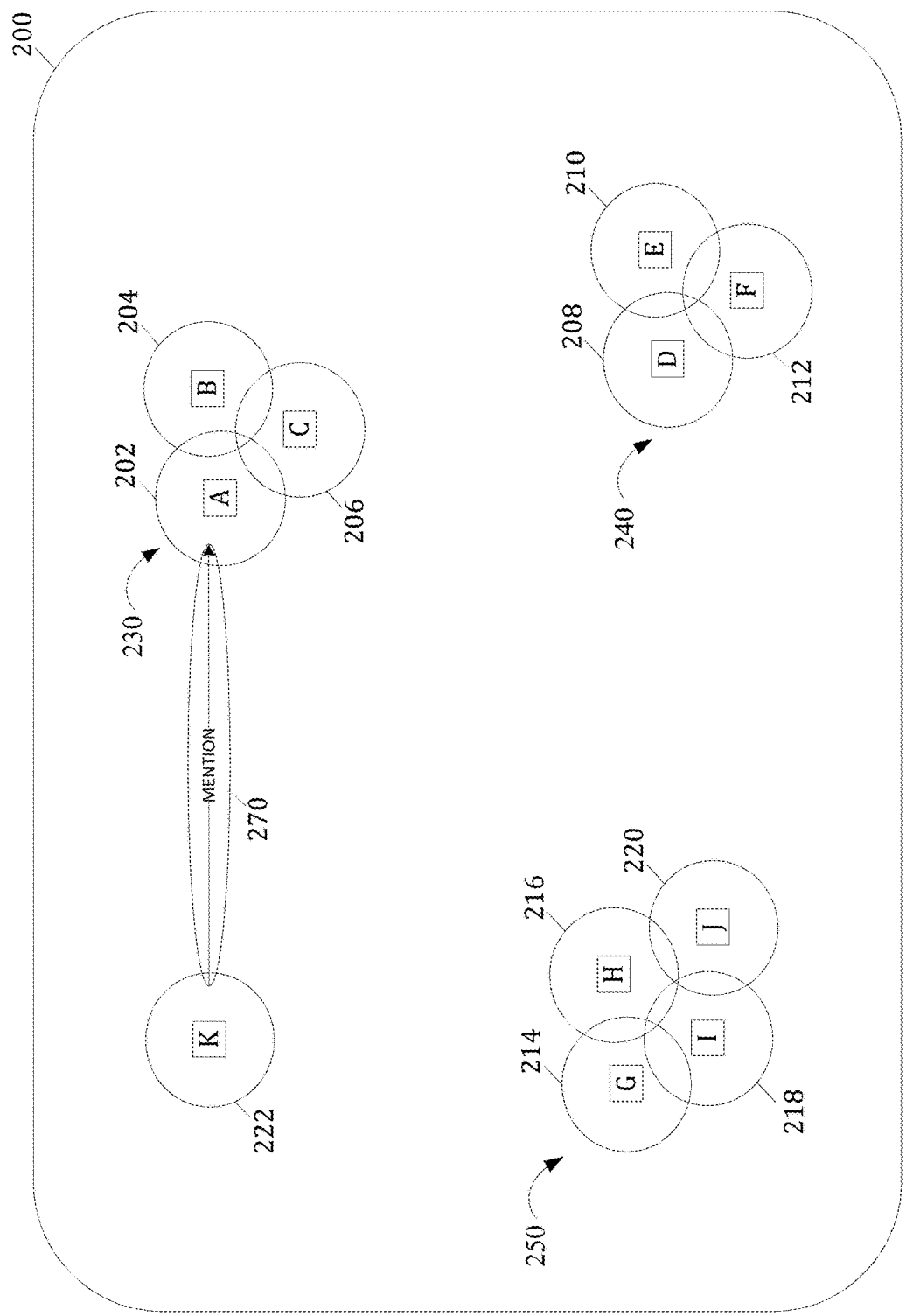
FIG. 15 depicts the example conferencing interface indicating a mention of a participant in another conversation.

FIG. 15 depicts the example conferencing interface indicating a mention of a participant in another conversation. The speech recognition and text analysis discussed above may also be used to determine if a participant's name has been uttered in a conversation. For example, the text may be analyzed against a current list of participants of the teleconference and/or an invite list for the teleconference to determine if an uttered name corresponds to a name of a participant of the teleconference. If the utterance of a participant name is detected, the participant may be notified, and audio from the corresponding conversation may be provided to the participant whose name was uttered.

In the example depicted in FIG. 15, User K's name has been uttered or mentioned in the first conversation 230. Based on the detection of the User K's name have been mentioned, User K is notified of the mention, and audio from the first conversation 230 is provided to User K. An utterance or mention indicator 270 may also be displayed in the interface between the eleventh participant interface element 222 corresponding to User K and the first conversation 230 to indicate that the first conversation 230 has mentioned User K.

Figure 16:
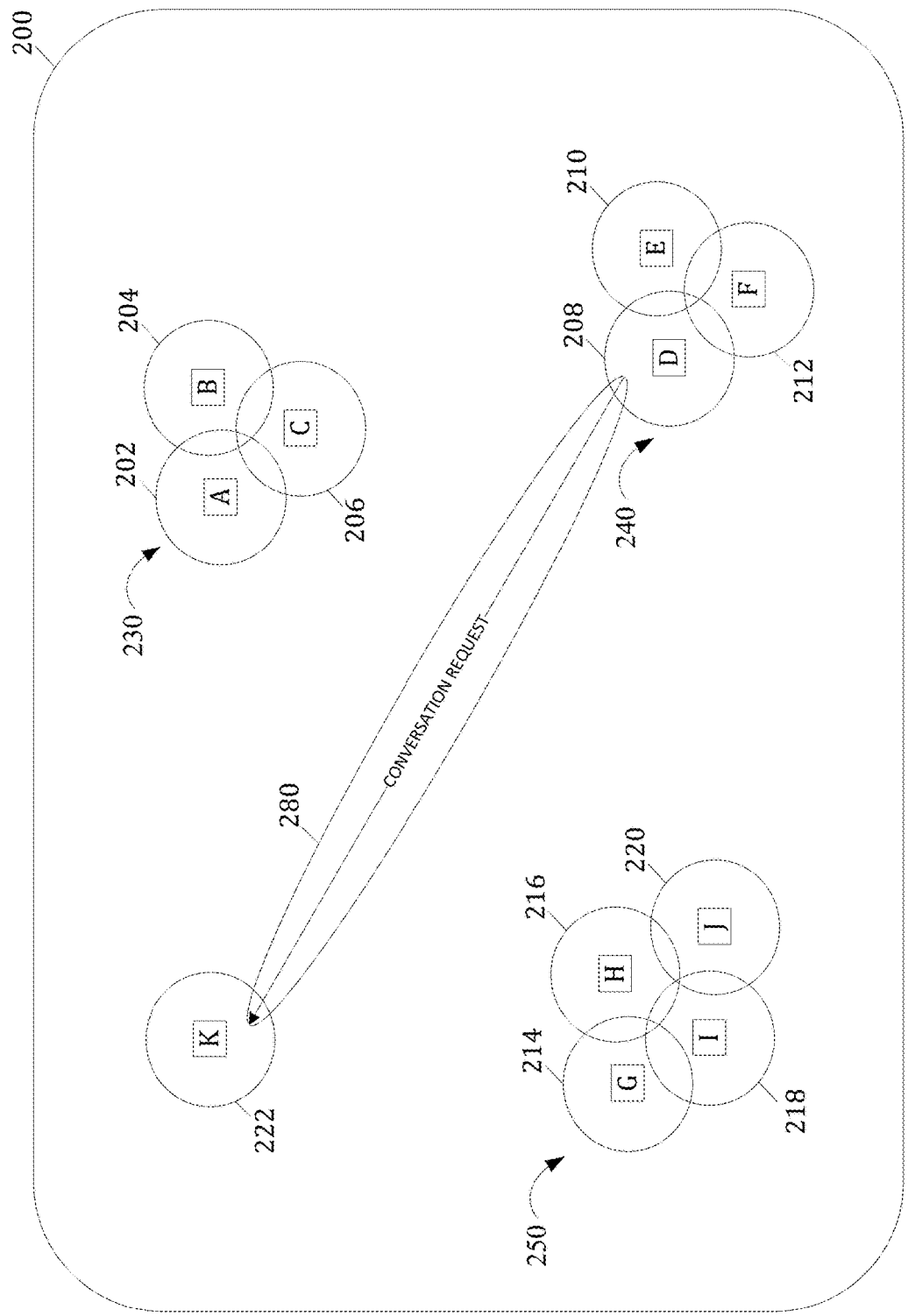
FIG. 16 depicts the example conferencing interface indicating a request for a participant to join a conversation.

FIG. 16 depicts the example conferencing interface indicating a request for a participant to join a conversation. In some examples, audio of conversations may also be monitored for a trigger word indicative of an invite or a request for another participant to join the conversation. For instance, the trigger word may be "Invite." When the trigger word is detected, a name following the word "invite" is identified, and the named participant is invited to the conversation.

In the example depicted in FIG. 16, the second conversation 240 has requested or invited User K to join the second conversation 240. The request may have been generated by one of Users D, E, or F uttering "Invite User K." When the request or invite is detected, User K may be notified of the invite and a conversation request indicator 280 may be displayed in the interface 200. The conversation request indicator 280 connects the participant interface element 222 of the invited user (e.g., the eleventh participant interface element 222 for User K) and the conversation from which the invite originated (e.g., the second conversation 240). Based on the invite request, audio from the conversation from which the invite originated (e.g., the second conversation 240) may be provided to the invited user (e.g., User K).

Additional privacy preferences and controls may also be provided to users of the teleconference. Users in conversations may opt-out of the various features provided by the present technology, and in some examples the user may opt-out of each of the features separately or all at once. Opting out of the features may be accomplished by setting user preferences and/or selecting user interface elements similar to marking a conversation private. For example, the participants of conversation 230 may indicate that mentions or user invites should not be monitored and/or transmitted during the conversation. In some examples, participants of a conversation may also opt out of any analysis of the conversation, which may prevent the speech from participants of the conversation from being converted to text and/or analyzed. Similarly, preferences may be available to prevent analysis of sentimentality, engagement levels, recommendations, and/or any other features described herein.

Figure 17:
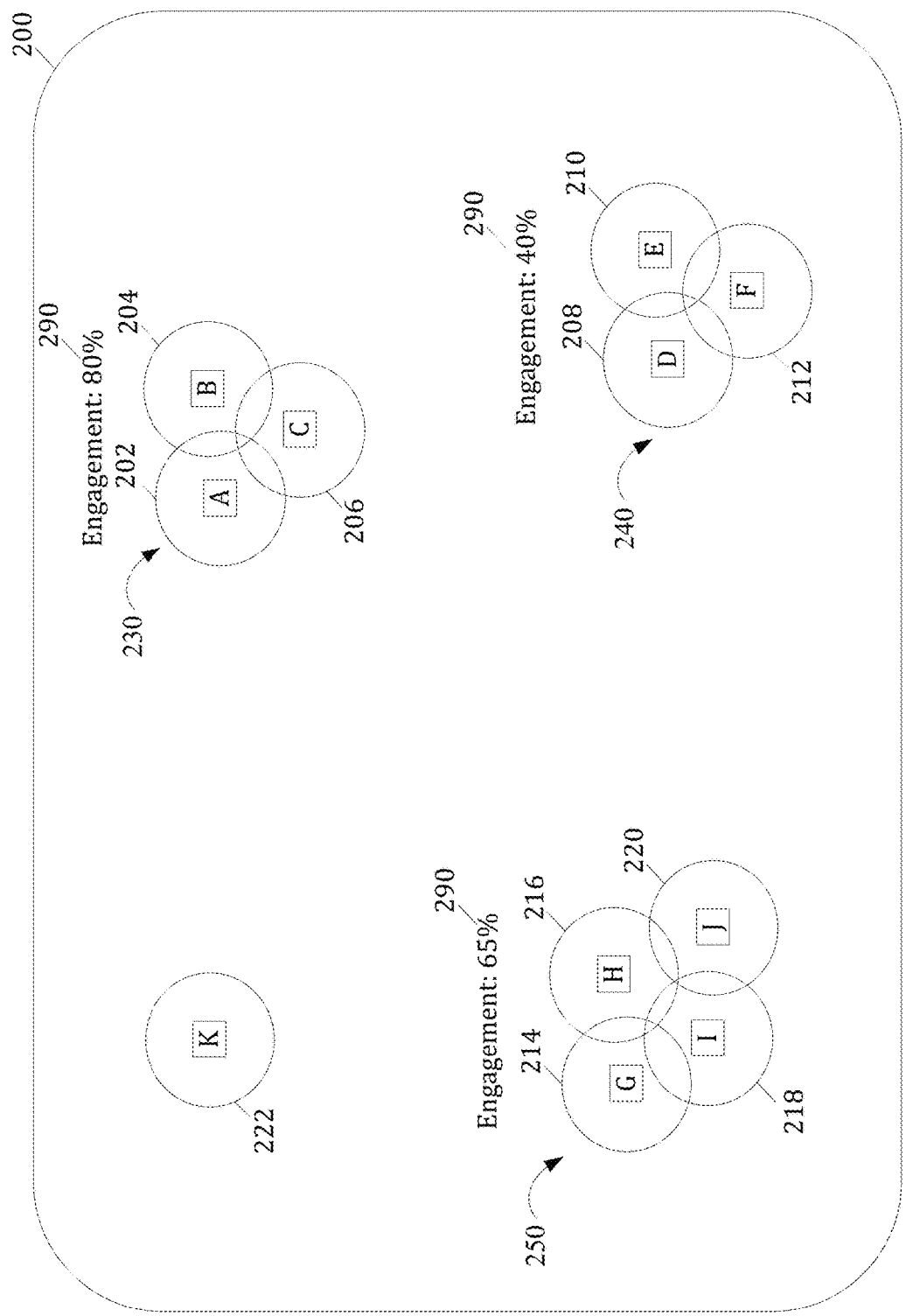
FIG. 17 depicts the example conferencing interface indicating participant engagement in conversations.

FIG. 17 depicts the example conferencing interface 200 indicating participant engagement in conversations. In some examples, audio of the conversations may be analyzed to determine the level of engagement from the participants of the conversations. An engagement indicator 290 may be displayed for each conversation to indicate the determined engagement level for the respective conversation. The engagement level may be determined from the body of text generated via speech recognition for each of the conversations. Additionally or alternatively, the engagement level may be determined from the audio itself. In either case, the engagement level monitors how frequently participants of the conversation are speaking. A conversation with a lower engagement level indicates that participants of the conversation are speaking less frequently than a conversation with a higher engagement level. The engagement level may also represent the number or percentage of users in the conversation that are speaking, so that the engagement level indicates whether the conversation is being controlled by one participant or the group is contributing more equally. Alternatively or additionally, the engagement score may also represent or include conversation cadence, such as the pace of conversation and the amount of words spoken over a period of time.

In the example depicted in FIG. 17, the first conversation has an engagement level of 80% as indicated by the engagement indicator 290. The engagement indicators 290 of the other conversations also indicate that the second conversation 240 has an engagement level of 40%, and the third conversation 250 has an engagement level of 65%.

Figure 18:
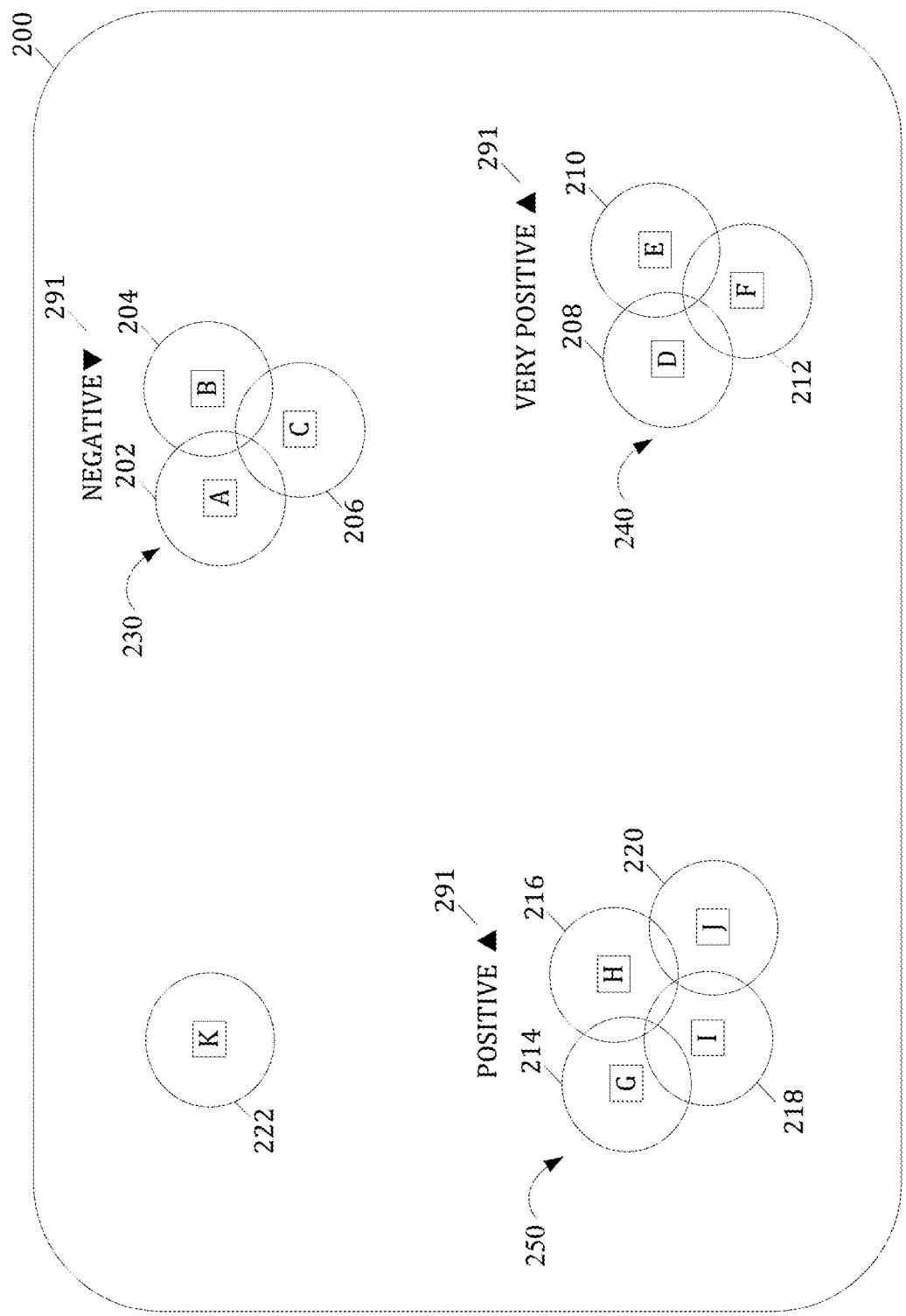
FIG. 18 depicts the example conferencing interface indicating sentiment of conversations.

FIG. 18 depicts the example conferencing interface 200 indicating sentiment of conversations. In some examples, audio of the conversations may be analyzed to determine the sentiment of the conversation. For example, the body of text generated from speech recognition of the audio of a conversation may be analyzed to determine the sentiment of the conversation (or the portion of the conversation analyzed where the audio is captured as a moving window). The sentiment of the conversation may include values such as very negative, negative, neutral, positive, and very positive. The overall sentiment of the conversation may be determined through the use of ML and/or AI techniques. For instance, the Text Analytics text-mining AI service from Microsoft Azure's Cognitive Services may be used to determine and generate sentiment labels for the body of text or a portion thereof.

Based on the determined sentiment of the conversation, a sentiment indicator 291 may be displayed near the respective conversation. For example, a sentiment indicator 291 for the first conversation 230 indicates that the sentiment is negative. The sentiment indicator 291 may include a text label and/or a graphical indicator, such as an up or down arrow which may be formatted (e.g., colored) differently depending on the sentiment. Similarly, a sentiment indicator 291 for the second conversation 240 indicates that the sentiment in the sentiment is very positive, and a sentiment indicator 291 for the third conversation 250 indicates that the sentiment is positive. By providing the sentiment indicators 291, users (such as new User K) may be able to make better decisions about which conversation to join.

Figure 19:
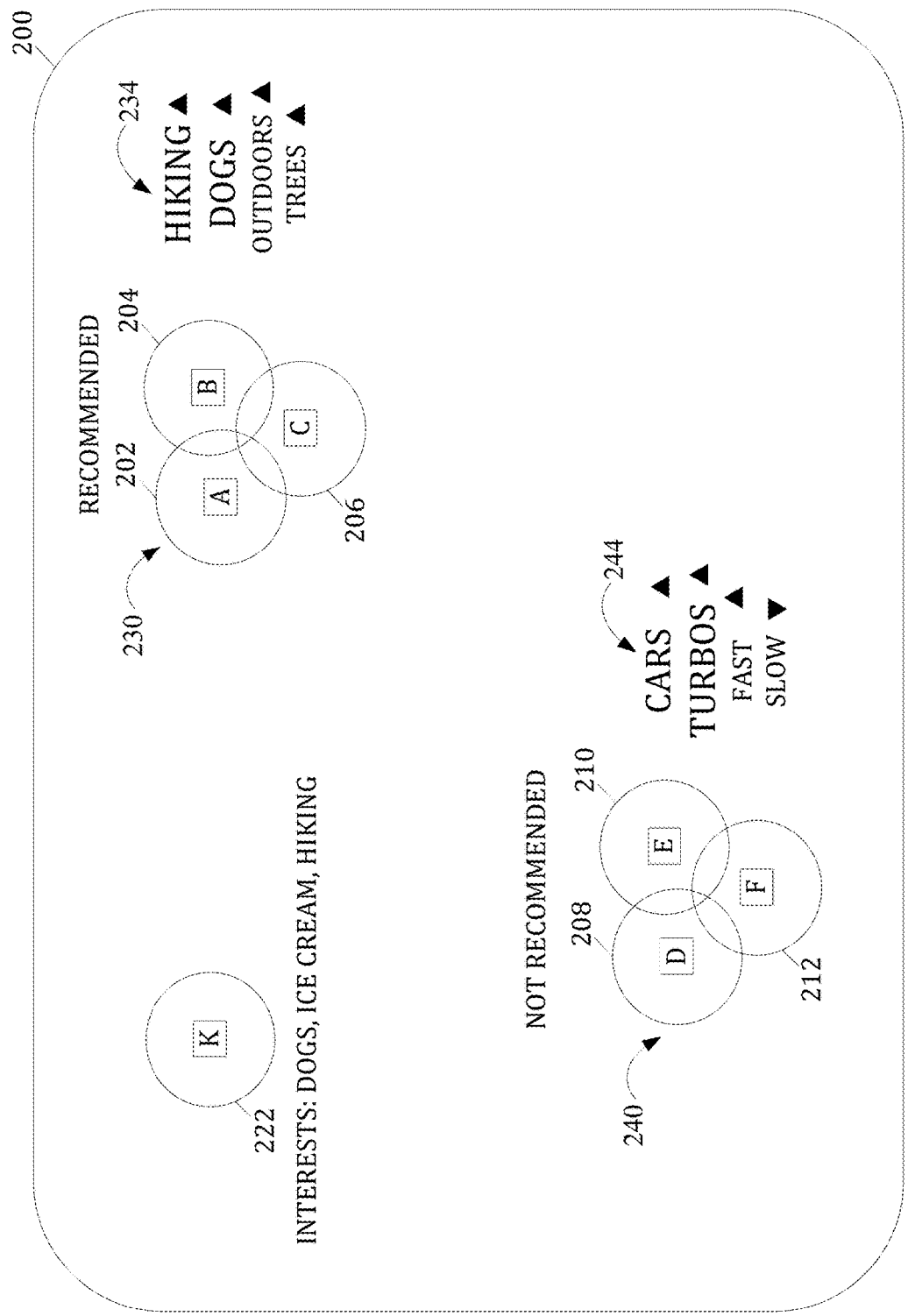
FIG. 19 depicts the example conferencing interface indicating conversation topics and associated sentiments.

FIG. 19 depicts the example conferencing interface 200 indicating conversation topics and associated sentiments. In some examples, sentiment for each topic of a conversation may also be determined and displayed in the interface 200. Providing a sentiment for the topics or keywords maybe done in addition to, or alternatively to, providing the overall sentiment for the conversation. The sentiment for the topics may be determined in a similar manner as the overall sentiment of the conversation. For example, the sentiment may be analyzed for smaller portions of the body of text (such as at the sentence level) to determine the sentiment for portions of the text including the keyword or the topic. For instance, sentiment may be determined for sentences in the text that include the topic or keyword. The sentiment for each topic may be displayed as a sentiment indicator adjacent or near each of the topics. The topic sentiment indicator may be graphical indicator (e.g., up or down arrow) that is indicative of the determined sentiment.

In FIG. 19, topics 234 for a first conversation 230 and topics 244 for a second conversation 240 are determined and displayed in the interface 200. Each of the topics includes a sentiment indicator in the form of an up or down arrow. The up arrow indicates a positive sentiment, and the down arrow indicates a negative sentiment. Accordingly, as an example, in the second conversation 240, the topics of cars, turbos, and fast have a positive sentiment, and the topic of slow has a negative sentiment.

The present technology may also provide recommended conversations based on preferences of a user. For example, new participant, User K, may join the teleconference, and the user may indicate his or her preferences or interests. The user's interests may also be stored in settings or a user profile for the user. The interests may also be based on prior conversations that the user has been a part of in prior teleconferences.

The user's indicated interests may then be compared to the topics for the respective conversations to determine if one or more conversations includes topics that are the same or similar to the indicated interests of the user. In the example depicted, User K has indicated that her interests include dogs, ice cream, and hiking. A comparison of those interests to the topics 234 for the first conversation 230 and topics 244 for the second conversation 240, reveals that the topics 234 for the first conversation 230 match more closely to the interests of User K. Accordingly, the first conversation 230 may be recommended and the second conversation 240 may not be recommended. In some examples, the sentiment for each of the topics may also be utilized in determining the recommendation. For example, if the topics of a conversation match the user's interests, but the sentiment for the topics is negative, the conversation may not be recommended. A recommendation indicator may also be displayed near the respective conversations to indicate whether the conversation is recommended or not.

In addition to the user being able to move his or her respective participant interface element to join a conversation, a user may also be able to select a conversation and the system may automatically move the participant interface element to the selected conversation. For example, User K may select the second conversation 240, and the system may automatically add User K to the second conversation 240 and move the eleventh participant interface element 222 to the second conversation 240. In some examples, a user may also be automatically added to a conversation when the user enters the teleconference. For instance, the user may be automatically added to a conversation based on the topics of the conversation (e.g., if the conversation is recommended), the engagement level of the conversation, and/or the number of participants in the conversation, among other potential factors. As an example, when the User K joins the teleconference, the User K may be automatically added to the first conversation 230 because the first conversation is recommended for the User K, as discussed above.

Figure 20:
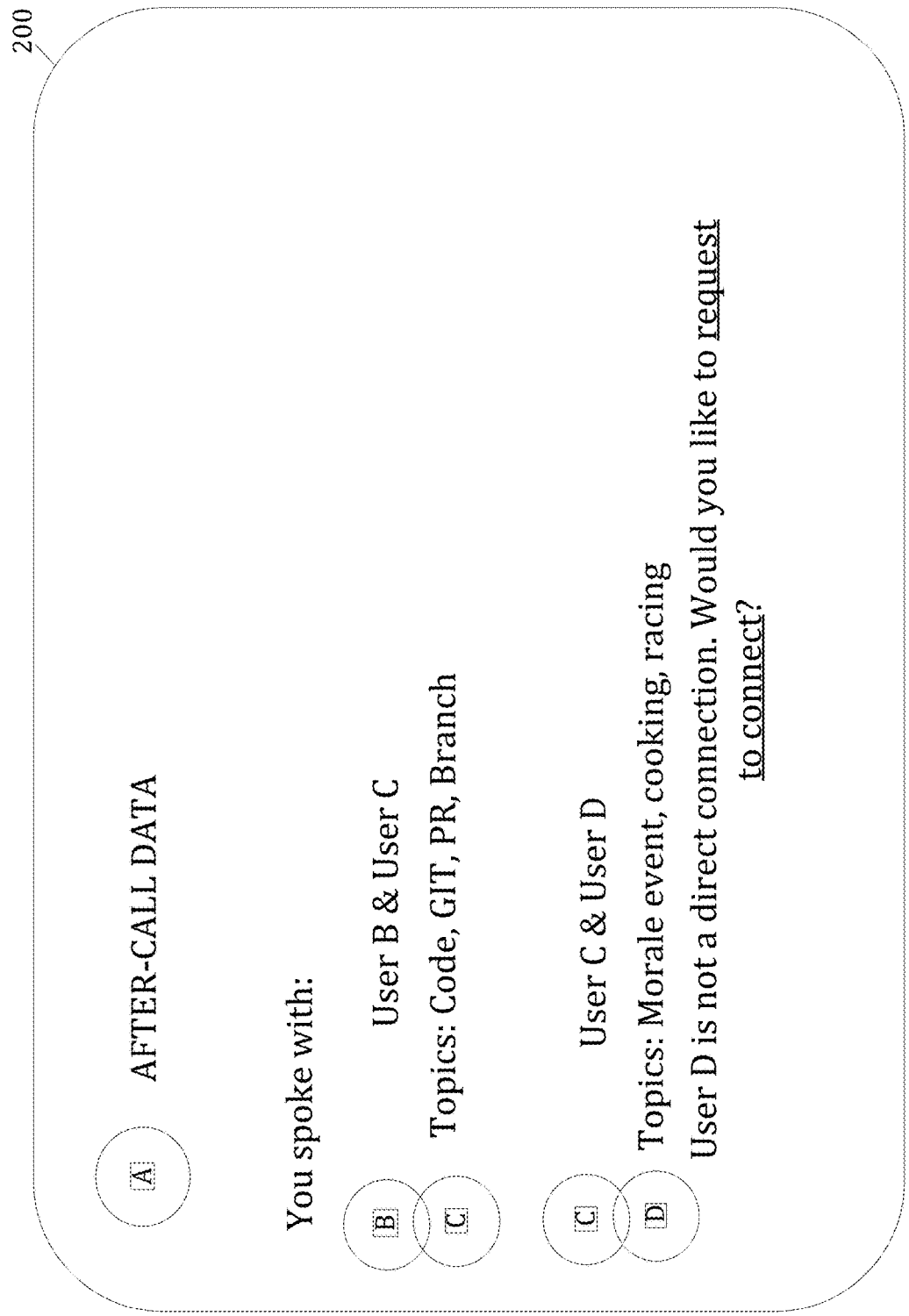
FIG. 20 depicts the example conferencing interface with after-call data for a participant.

FIG. 20 depicts the example conferencing interface with after-call data for a participant. Once the teleconference ends or a particular user leaves the teleconference, after-call data may be presented to the particular user based on the interactions of the user during the teleconference. For example, the after-call data may indicate other participants with whom the particular participant spoke during the meeting (e.g., other participants that were in conversations involving the particular participant). The after-call data may also indicate topics discussed by the particular participant with other participants during the teleconference (e.g., topics of the conversation involving the particular participant).

The example after-call data may be for a User A after a teleconference. The after-call data indicates that User A participated in a first conversation with Users B and C, and that during that conversation the topics of Code, GIT, PR, and Branch were discussed. The after-call data also indicates that User A participated in a second conversation with Users C and D, and that during that second conversation the topics of morale event, cooking, and racing were discussed. In some examples, the sentiment of the conversations, the engagement level of the conversations, and/or the sentiments for the topics may also be included in the after-call data.

The after-call data may also be based on or utilize the supplemental data from the networking and/or social media database. For instance, the present technology may determine, based on the supplemental data, that User A is not a direct connection with another participant with whom the particular participant spoke during the teleconference, such as User D. Based on the determination that User A is not a direct connection with User D, a link may be generated to the website corresponding to the networking or social media database from which the supplemental data was accessed such that User A can request to connect to User D.

Figure 21:
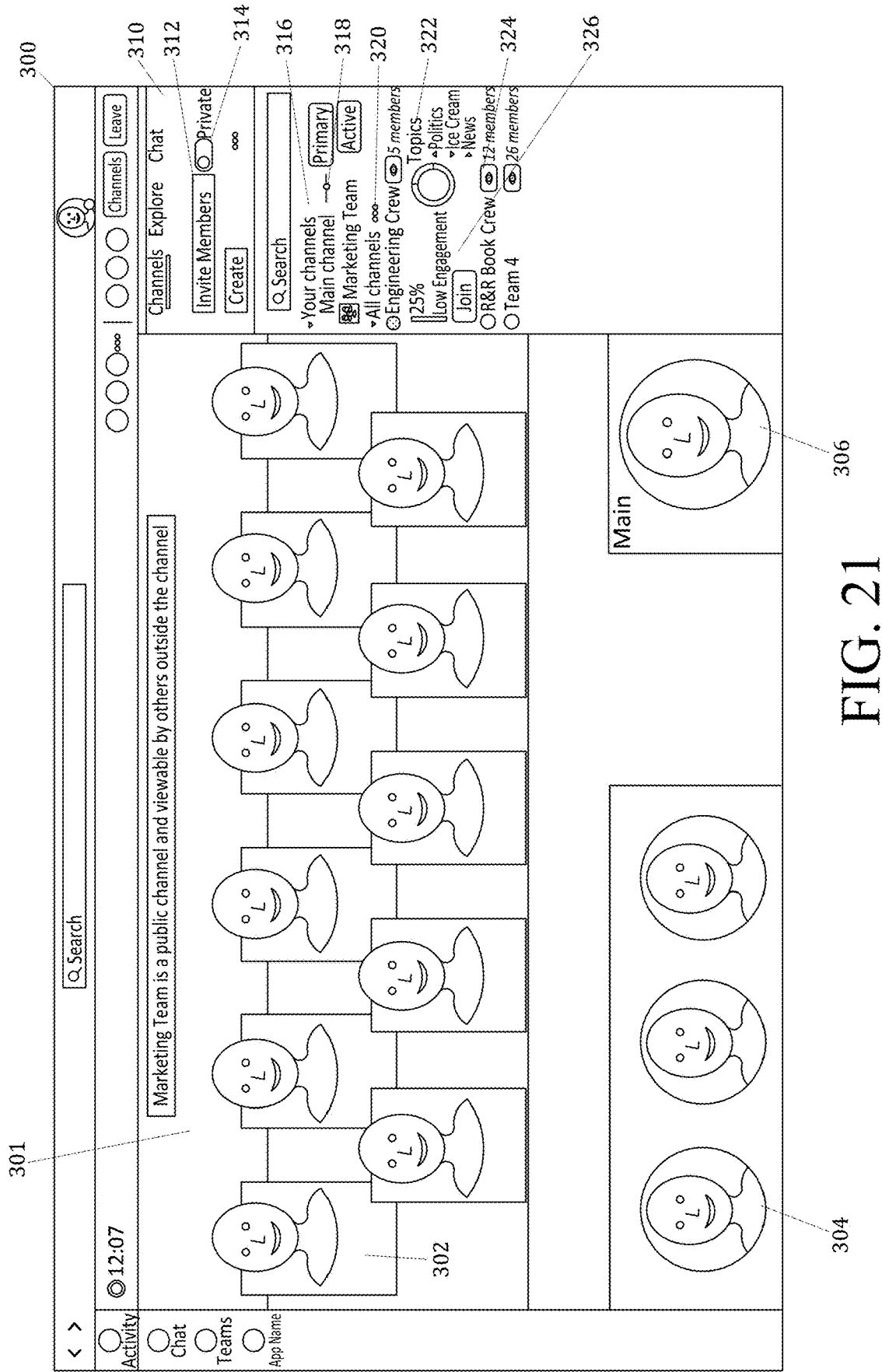
FIG. 21 depicts another example conferencing interface for a teleconference with multiple participants.

FIG. 21 depicts another example conferencing interface 300 for a teleconference with multiple participants. The interface 300 includes a plurality of participant interface elements 302, 304 in a different format than the participant interface elements discussed and shown in the figures above. Some participants may be shown as participant interface elements 302 in a first segment of the interface 302, such as seated in virtual chairs. Additional participants may be shown as participant interface elements 304 in a different portion of the interface 300. In addition, a presenter or main participant may be represented by a presenter interface element 306. Each of the participant interface elements 302, 304 and/or the presenter interface element 306 may be images, video feeds, and/or icons of different participants in the teleconference.

The interface 300 may also include a pane 310 that provides additional insights and exploration options for the teleconference. The pane 310 may have a plurality of tabs that result in different displays and options in the pane 310. In the example shown, the pane 310 includes a channels tab, an explore tab, and a chat tab. Selection of the channels tab may cause the pane 310 to display information about different channels or conversations. Selection of the explore tab may cause the pane 310 to display features for exploring different channels. Selection of the chat tab may cause the pane 310 to display a chat interface to allow a user to interact with other participants via a text-based chat. In FIG. 21, the channels tab is selected.

The pane 310 may include an input box 312 for inviting participants to join a conversation, which may also be referred to as a channel in discussing interface 300. After participants are identified through the input box, a new conversation or channel may be created based on the selection of a "create" button. A toggleable privacy element 314 may also be displayed to allow for selection of whether the conversation or channel should be marked as private.

In addition, the pane 310 also includes a listing 316 of the user's channels. For one or more of the channels, such as the channel that the user is currently in, an adjustable volume control element 318 may be displayed that allows a user to control the volume of the audio stream for the respective channel. In some examples, a main channel may be available where a presenter may be presenting, and audio from that channel may be provided to all participants. Subchannels may also be available for side discussions with other participants. When a user is in a subchannel, the user receives audio from the subchannel and the main channel, but the user may only transmit audio to other participants of the subchannel, not all participants of the main channel (unless the user is asking a question to the presenter, as discussed above). An additional adjustable volume control element may be provided for a subchannel or subconversation for which the user is also in.

The pane 310 may also include an expandable listing 320 of additional channels or conversations for which the user may join. In the example depicted, the additional-channel listing 320 includes an Engineering crew channel, an R&R Book Crew channel, and a Team 4 channel. Each channel may include a preview button 324 and a number of participants in the channel. When a channel is selected, additional information about the channel may be displayed in the pane 310. For example, an engagement level 326 of the channel may be displayed and topics 322 being discussed in the channel may be displayed. The topics 322 may also include a sentiment for each of the topics. The engagement level 326, the topics 322, and the sentiments for each channel may be determined in the same manner as discussed above with respect to the different conversations of the teleconference.

Figure 22:
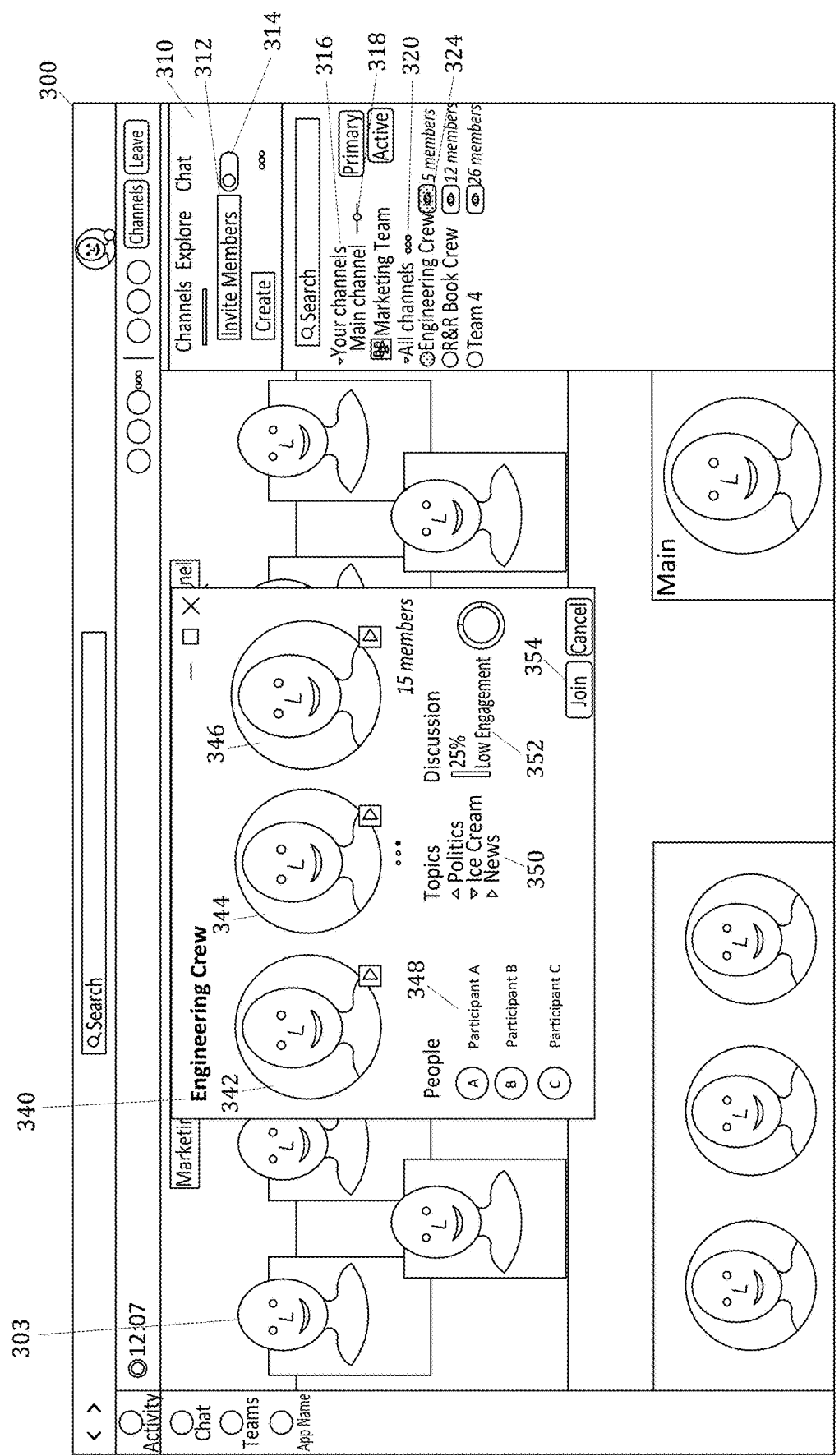
FIG. 22 depicts the example conferencing interface with a preview window.

FIG. 22 depicts the example conferencing interface 300 with a preview window 340. When the preview button 324 is selected for a channel, the preview window 340 may be displayed in the interface 300. The preview window 340 may include video previews 342-346 for different participants in the channel for which the preview is generated. A list 348 of participants of the channel may also be displayed in the preview window 340. The topics 350 (and their respective sentiments) and the engagement level 352 for the channel may also be displayed in the preview window 340.

The preview window may also include a join button 354. Upon receipt of the selection of the join button, the user is placed in the channel, and the interface 300 may be updated to show participant interface elements 303 of the channel that has been joined.

Figure 23:
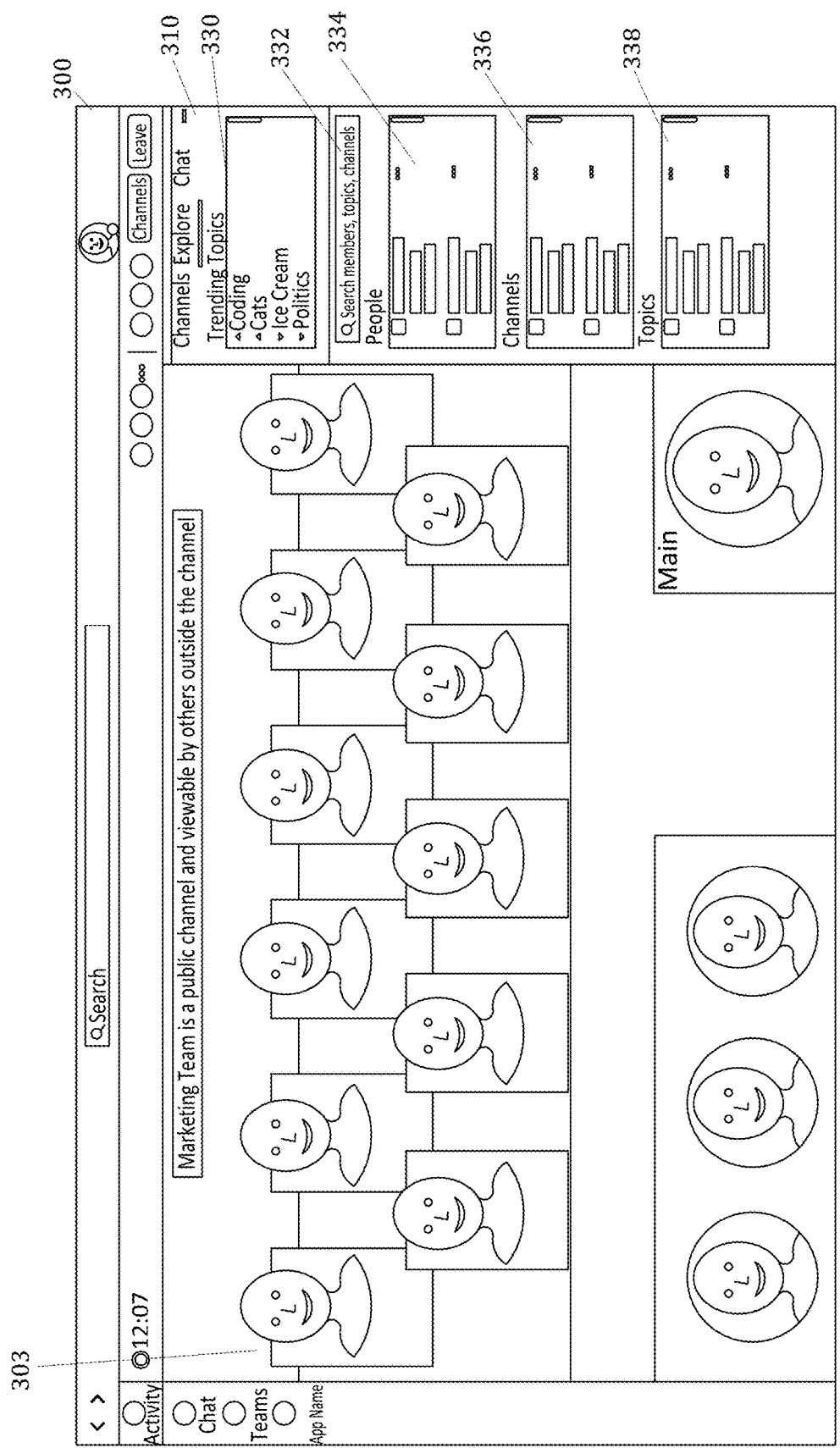
FIG. 23 depicts the example conferencing interface with an exploration pane.

FIG. 23 depicts the example conferencing interface 300 with an exploration pane. When the exploration tab of the pane 310 is selected, the pane 310 may appear as shown in FIG. 23. The pane 310 may include trending topics 330 and associated sentiment for the topics. The trending topics 330 include the top topics across all the channels that are available to the user. The user may select one of the trending topics 330, which may cause the channel from which the trending topic is being discussed to appear. The pane 310 may also include a search box 332 to search for people/participants, topics, and/or channels. The pane 310 may further display a list 334 of people/participants, a list 336 of channels, and a list 338 of topics. Such lists may be results that are provided to query terms entered into the search box 332.

Figure 24:
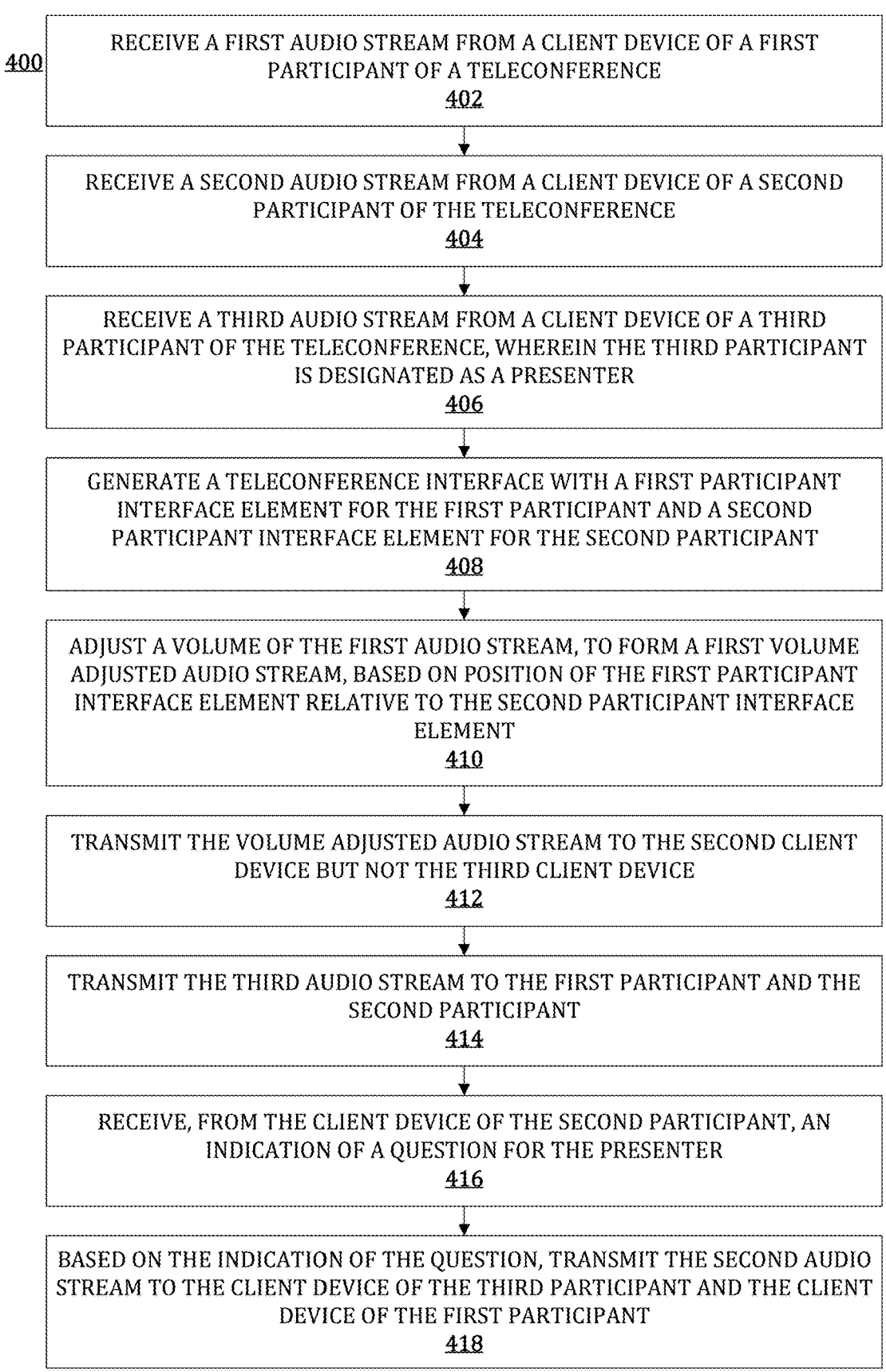
FIG. 24 depicts an example method for providing enhanced teleconferencing.

FIG. 24 depicts an example method 400 for providing enhanced teleconferencing. The method 400 may be performed by the teleconferencing servers and/or the client devices of the systems discussed herein. At operation 402, a first audio stream from a client device of a first participant of a teleconference is received. For example, audio for User A may be received. At operation 404, a second audio stream from a client device of a second participant of the teleconference is received. For example, audio for User B may be received. At operation 406, a third audio stream from a client device a third participant of the teleconference is received. For example, audio for User C may be received. The third participant (e.g., User C) may be a presenter and/or have a presenter status. In addition to the audio streams, corresponding video streams may also be received at operations 402-406.

At operation 408, a teleconference interface is generated. The teleconference interface includes a first participant interface element for the first participant and a second participant interface element for the second participant. The position of the first participant interface element may be controllable or adjustable by the first participant, and the position of the second participant interface element may be controllable or adjustable by the second participant.

At operation 410, based on the position of the first participant interface element relative to the position of the second participant interface element, a volume of the first audio stream is adjusted to form a first volume-adjusted audio stream. At operation 412, the first volume-adjusted audio stream is transmitted to the second client device (e.g., the client device of User B). The first volume-adjusted audio stream, however, is not transmitted to the third client device such that the presenter (User C) does not receive the first volume-adjusted audio stream. At operation 414, the third audio stream (e.g., the audio stream from the presenting User C) is transmitted to the client device of the first participant and the client device of the second participant such that the first participant (User A) and the second participant (User C) are able to hear the audio stream of the presenter.

At operation 416, an indication of a question for the presenter is received from the client device of the second participant (e.g., an indication that User B has a question for the presenter, User C). At operation 418, based on the indication of the question received in operation 416, the second audio stream is transmitted to the client device of the third participant (e.g., the presenter) and the client device of the first participant. Accordingly, the presenter and the other participants can both hear the question.

FIG. 25 depicts another example method 500 for providing enhanced teleconferencing. The method 500 may be performed by the teleconferencing servers and/or the client devices of the systems discussed herein. At operation 502, a teleconference interface is generated. The teleconference interface includes a plurality of user-controlled and/or system-controlled participant interface elements representing participants of the teleconference. At operation 504, a first conversation is identified based on the positions, in the teleconference interface, of a first subset of the participant interface elements. For example, the participant interface elements that are within a threshold distance and/or have overlapping boundaries, may be determined to be a part of a conversation. At operation 506, a second conversation is identified based on the positions, in the teleconference interface, of a second subset of the participant interface elements.

At operation 508, supplemental data for the participants of the teleconference is accessed. The supplemental data may be accessed from a database of at least one of a networking or social media database. At operation 510, the supplemental data is presented within the participant interface elements. For instance, the supplemental data may be a degree of connection with other participants, and the degree may be displayed in or otherwise associated with the corresponding participant interface elements.

At operation 512, a privacy indication to make the first conversation private may be received from a client device of a participant in the first subset of participant interface elements (e.g., a participant in the first conversation). At operation 514, based on receiving the privacy indication, additional participants are prevented from joining the first conversation. Preventing the other participants from joining the conversation may include preventing other participant interface elements from being moved into the threshold distance or have an overlapping border with a participant interface element that is already part of the conversation.

Figure 26:
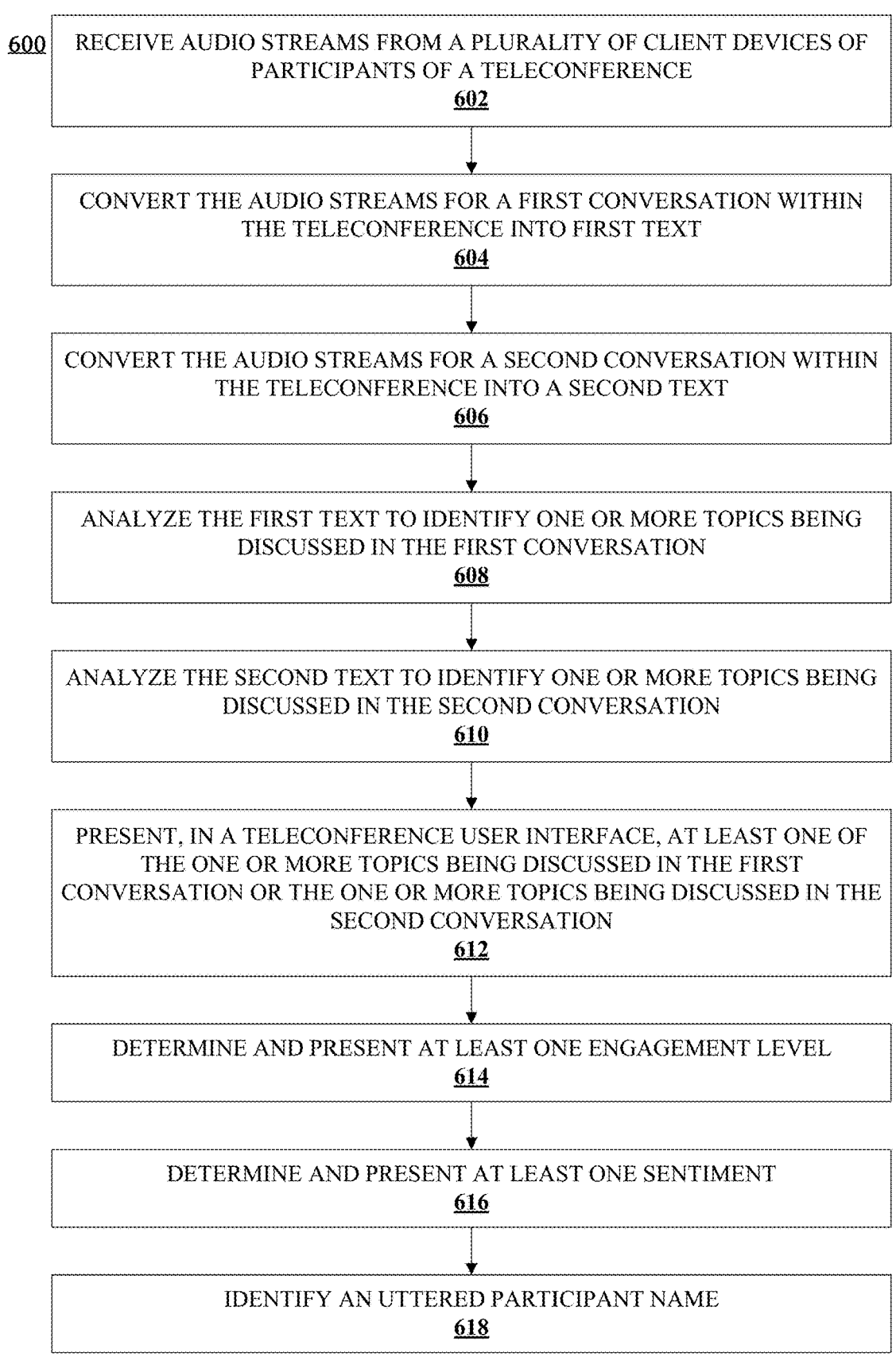
FIG. 26 depicts another example method for providing enhanced teleconferencing.

FIG. 26 depicts another example method 600 for providing enhanced teleconferencing. The method 600 may be performed by the teleconferencing servers and/or the client devices of the systems discussed herein. At operation 602, audio streams from a plurality of client devices of participants of a teleconference are received. At operation 604, the audio streams for participants of a first conversation are converted into first text using speech-to-text or speech recognition algorithms. At operation 606, the audio streams for participants of a second conversation are converted into second text using speech-to-text or speech recognition algorithms.

At operation 608, the first text is analyzed to identify one or more topics or keywords being discussed in the first conversation, and operation 610 the second text is analyzed to identify one or more topics being discussed in the second conversation. The analysis of the text may be performed using at least any of the algorithms discussed above. At operation 612, one or more of the topics identified in operation 608 or operation 610 are displayed in the teleconference interface. The topics may be displayed or presented in manner so as to associate the topics with the conversation from which they were generated.

At operation 614, at least one engagement level for a conversation is determined and presented in the teleconference interface. The engagement level may be determined from the audio streams and/or the first text or second text. For example, an engagement level for the first conversation may be determined, and an engagement level for a second conversation may be determined. The respective engagement levels may be displayed or presented as engagement indicators associated with the respective indicators.

At operation 616, at least one sentiment is determined and presented for at least one conversation and/or a topic of the conversation. The sentiment may be determined from the audio streams and/or the first text or second text. In some examples, sentiment may also be determined from facial expressions extracted from video streams of the participants. The sentiment may be determined using at least any of the algorithms discussed above for determining sentiment. A sentiment indicator may be displayed as associated with the conversation and/or the topic that indicates the determined sentiment.

At operation 618, an uttered participant name is identified in the first text and/or the second text. Based on identifying or detecting that a participant's name has been uttered, that participant may be notified and audio from the conversation from which the name was uttered may be provided to the participant.

Figure 27:
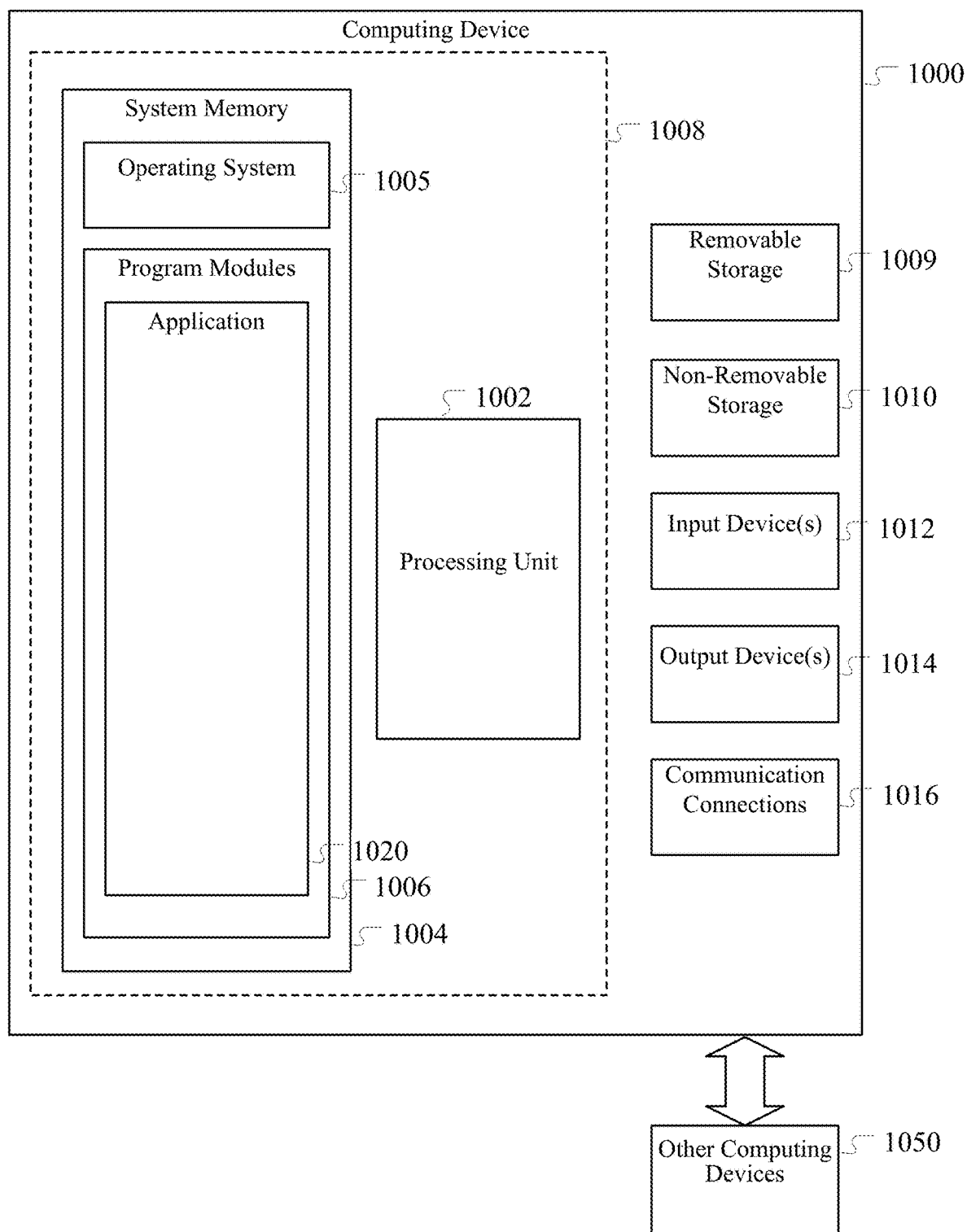
FIG. 27 depicts a block diagram illustrating physical components (e.g., hardware) of a computing device.

FIG. 27 is a block diagram illustrating physical components (e.g., hardware) of a computing device 1000 with which aspects of the disclosure may be practiced. For example, the computing device 1000 may illustrate components of processing devices or servers of the system 100, including client devices and/or servers of system 100. The computing device components described below may be suitable for the computing devices and systems described above. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories.

The system memory 1004 may include an operating system 1005 and one or more program modules 1006 suitable for running software application 1020, such as the applications 112 run by the computing devices 102, as well as the one or more virtual machines and/or one or more components associated with the hosted services that are supported by the systems described herein. The operating system 1005, for example, may be suitable for controlling the operation of the computing device 1000.

Furthermore, embodiments of the disclosure may be practiced in conjunction with a graphics library, other operating systems, or any other application program and is not limited to any particular application or system. This basic configuration is illustrated in FIG. 27 by those components within a dashed line 1008. The computing device 1000 may have additional features or functionality. For example, the computing device 1000 may also include additional data storage devices (removable and/or non-removable) such as, for example, solid-state drives, magnetic disks, optical disks, or tape. Such additional storage is illustrated in FIG. 27 by a removable storage device 1009 and a non-removable storage device 1010.

As stated above, a number of program modules and data files may be stored in the system memory 1004. While executing on the processing unit 1002, the program modules 1006 (e.g., application 1020) may perform processes including, but not limited to, the aspects, as described herein. Other program modules that may be used in accordance with aspects of the present disclosure may include virtual machines, hypervisors, and other types of applications such as electronic mail and contacts applications, word processing applications, spreadsheet applications, note taking applications, database applications, slide presentation applications, drawing or computer-aided application programs, etc.

Furthermore, embodiments, or portions of embodiments, of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 27 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 28:
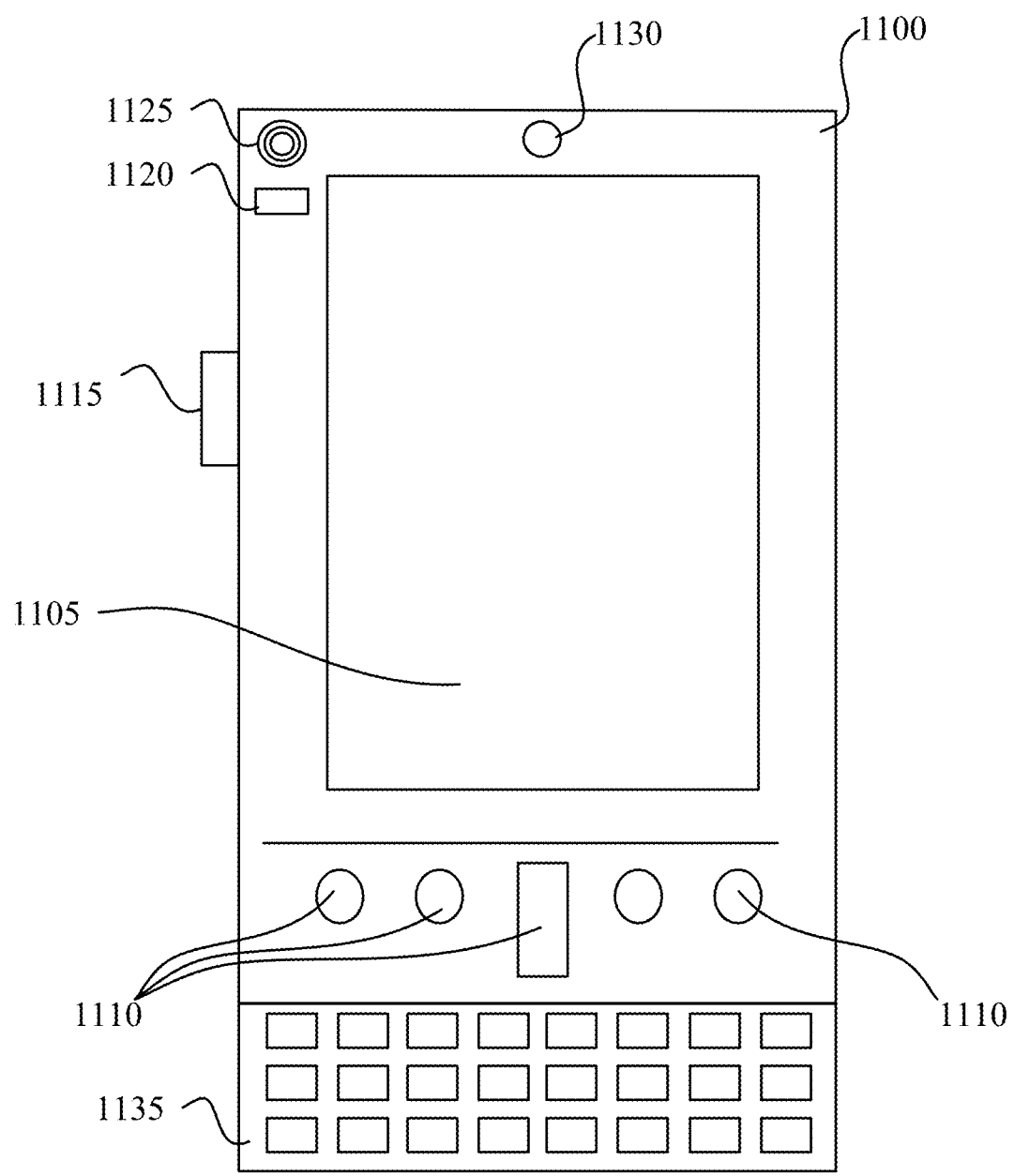
FIGS. 28-29 illustrate an example mobile computing device.
Figure 29:
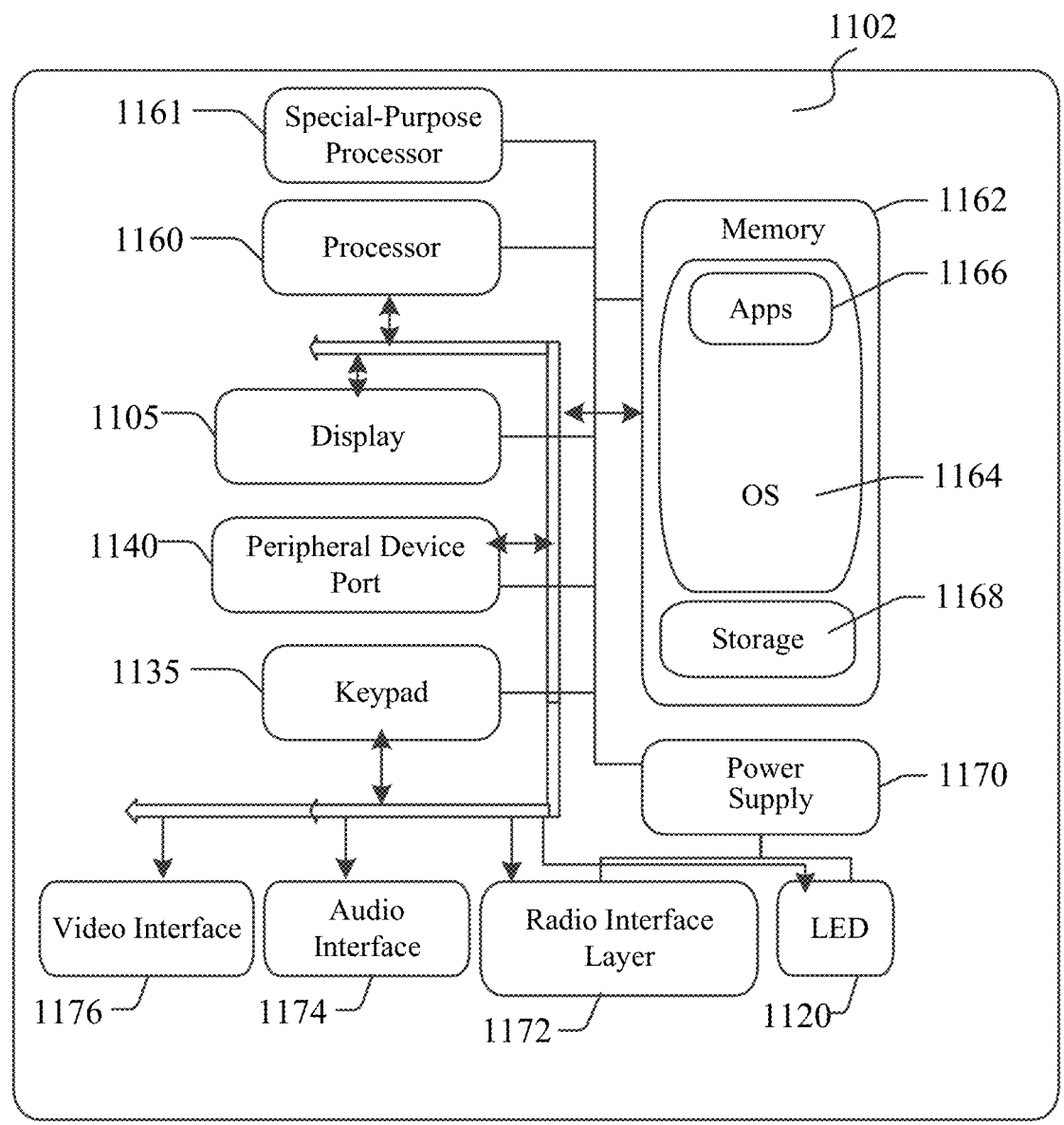

As previously discussed, the aspects and functionalities described herein may operate over distributed systems such as the system 100 described in FIG. 1, where application functionality, memory, data storage and retrieval and various processing functions may be operated remotely from each other over a distributed computing network, such as the Internet or an intranet. Resultantly, users may utilize associated computing devices 102 to interact with the hosted services, including the communication service 106, the storage service 108, and the productivity services 110. User interfaces and information of various types may be displayed via on-board computing device displays or via remote display units associated with such computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 28 and 29 below include an example computing device 102 that may be utilized to execute locally installed applications or run a web browser through which web applications are accessible to send and receive electronic communications as well as edit files included as attachments in the electronic communications, among other functionalities.

FIGS. 28-29 illustrate an example mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 28, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display).

If included, a side input element 1115 allows additional user input. The side input element 1115 may be a rotary switch, a button, or any other type of manual input element. Additionally, if included, an on-board camera 1130 allows further user input in the form of image data captured using the camera 1130. In alternative aspects, mobile computing device 1100 may incorporate more or less input elements. For example, the display 1105 may not be a touch screen in some embodiments.

In yet another alternative embodiment, the mobile computing device 1100 is a portable phone system, such as a cellular phone. The mobile computing device 1100 may also include a keypad 1135. The keypad 1135 may be a physical keypad or a "soft" keypad generated on the touch screen display.

In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device (e.g., a peripheral device). These input and/or output ports are also referred to as peripheral device ports 1140 as illustrated in FIG. 29.

FIG. 29 is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs 1166 include phone dialer programs, e-mail programs, personal information management (PIM) programs, word processing programs, spreadsheet programs, Internet browser programs, messaging programs, and so forth. In an aspect, the application programs 1166 may also include the applications 112 by which the hosted services may be accessed over a network. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 described with reference to FIG. 28 may be used to provide visual notifications, and/or an audio interface 1174 may be used for producing audible notifications via the audio transducer 1125 described with reference to FIG. 28. These devices may be directly coupled to the power supply 1170 so that when activated, they remain on for a duration dictated by the notification mechanism even though the processor(s) (e.g., processor 1160 and/or special-purpose processor 1161) and other components might shut down for conserving battery power. The visual indicator 1120 may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 29 by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a computing device in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Based on the foregoing, various aspects related to enhanced teleconferencing should be appreciated, including at least the following aspects and examples. In an aspect, the technology relates to a system for providing enhanced teleconferencing. The system includes at least one processor; and a memory storing instructions that, when executed by the at least one processor cause the system to perform operations. The operations include receiving audio streams from a plurality of client devices of participants of a teleconference; converting the audio streams for a first conversation within the teleconference into first text; converting the audio streams for a second conversation within the teleconference into a second text; analyzing the first text to identify one or more topics being discussed in the first conversation; analyzing the second text to identify one or more topics being discussed in the second conversation; and presenting, in a teleconference user interface, at least one of the one or more topics being discussed in the first conversation or the one or more topics being discussed in the second conversation.

In an example, the operations further include based on the analysis of the first text, determining an engagement level of the participants of the first conversation; and presenting, in the teleconference user interface, an engagement indictor indicating the determined engagement level. In another example, the operations further include based on the analysis of the first text, determining a sentiment associated with the identified one or more topics of the first conversation; and based on the determined sentiment, presenting a sentiment indicator adjacent to the one or more topics of the first conversation. In further example, the one or more topics of the first conversation are presented in response to a selection of the first conversation. In yet another example, the one or more topics of the first conversation include a first topic and a second topic, and the first topic is displayed in a more dominant format than the second topic based on at least one of: the first topic occurring more frequently in the first text, the first topic occurring more recently in the first text, or the first topic matching one or more user interests. In still another example, the operations further include receiving a selection of the first conversation; and based on receiving the selection of the first conversation, providing a video preview of the participants in the in the first conversation.

In another aspect, the technology relates to a computer-implemented method for providing enhanced teleconferencing. The method includes receiving audio streams from a plurality of client devices of participants of a teleconference; converting the audio streams for a first conversation within the teleconference into first text; converting the audio streams for a second conversation within the teleconference into a second text; analyzing the first text to identify one or more topics being discussed in the first conversation; analyzing the second text to identify one or more topics being discussed in the second conversation; and presenting, in a teleconference user interface, at least one of the one or more topics being discussed in the first conversation or the one or more topics being discussed in the second conversation.

In an example, the method further includes based on the analysis of the first text, determining an engagement level of the participants of the first conversation; and presenting, in the teleconference user interface, an engagement indictor indicating the determined engagement level. In another example, the method further includes based on the analysis of the first text, determining a sentiment associated with the identified one or more topics of the first conversation; and based on the determined sentiment, presenting a sentiment indicator adjacent to the one or more topics of the first conversation. In a further example, the one or more topics of the first conversation are presented in response to a selection of the first conversation. In yet another example, the one or more topics of the first conversation include a first topic and a second topic, and the first topic is displayed in a more dominant format than the second topic based on the first topic occurring more frequently in the first text. In still another example, the method further includes receiving a selection of the first conversation; and based on receiving the selection of the first conversation, providing a video preview of the participants in the in the first conversation.

In another aspect, the technology relates to a computer-implemented method for providing enhanced teleconferencing interface. The method includes presenting, in a teleconferencing interface, a plurality of participant interface elements in the teleconferencing interface in a first conversation; presenting, in the teleconferencing interface, a pane including conversation indicators for one or more conversations including at least a second conversation; receiving a selection of a conversation indicator for the second conversation; and in response to receiving the selection of the conversation indicator for the second conversation, presenting, in the pane, one or more topics being discussed in the second conversation.

In an example, the method further includes receiving audio streams from participants of the second conversation; converting the audio streams to text; and analyzing the text to identify the one or more topics. In another example, the method further includes based on the analysis of the text, determining a sentiment associated with the one or more topics; and based on the determined sentiment, presenting a sentiment indicator adjacent to the one or more topics. In yet another example, the method further includes presenting, in the pane, a selectable preview element for the second conversation; receiving a selection of the selectable preview element; and based on receiving the selection of the selectable preview element, presenting a preview window that includes video streams of participants in the second conversation. In still another example, the method further includes presenting, in the preview window, the one or more topics the being discussed in the second conversation and a level of engagement for the second conversation. In a further example, the pane includes an exploration tab, and the method further includes: receiving a selection of the exploration tab; and in response to receiving the selection of the exploration tab, presenting, in the pane, participants of conversations, available conversations, and topics being discussed in conversations. In yet another example, the method further includes presenting, in the pane, a dynamic list of trending topics across the available conversations, wherein the list of trending topics is based on analysis of audio streams from the available conversations. In still yet another example, the method further includes presenting an adjustable volume control element for controlling the volume of an audio stream for a main conversation; and providing the audio stream for the main conversation and a subconversation to a client device of a participant to whom the teleconferencing interface is presented.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for providing enhanced teleconferencing, comprising:
    presenting, in a teleconferencing interface, a plurality of first participant interface elements in a conversation;
    presenting, in the teleconferencing interface, a pane including one or more conversation indicators for one or more respective other conversations;
    presenting, in the pane, selectable preview elements for the one or more respective other conversations;
    receiving a selection of a selectable preview element for another conversation;
    in response to receiving the selection of the selectable preview element for the other conversation, presenting a preview window that includes a topic being discussed in the other conversation and a plurality of second participant interface elements in the other conversation.

2. The computer-implemented method of claim 1, further comprising:
    receiving audio streams from client devices of participants of the other conversation;
    converting the audio streams to text; and
    analyzing the text to identify the topic.

3. The computer-implemented method of claim 2, further comprising:
    based on the analysis of the text, determining a sentiment associated with the topic; and
    based on the sentiment, presenting a sentiment indicator adjacent to the topic.

4. The computer-implemented method of claim 1, further comprising presenting, in the preview window, a level of engagement for the other conversation.

5. The computer-implemented method of claim 1, wherein the pane includes an exploration tab, and the computer-implemented method further comprises:
    receiving a selection of the exploration tab; and
    in response to receiving the selection of the exploration tab, presenting, in the pane, participants of the one or more respective other conversations and topics being discussed in the one or more respective other conversations.

6. The computer-implemented method of claim 5, further comprising presenting, in the pane, a list of trending topics across the one or more respective other conversations, wherein the list of trending topics is based on analysis of audio streams from the one or more respective other conversations.

7. The computer-implemented method of claim 5, further comprising:
    presenting an adjustable volume control element for controlling a volume; and
    outputting, based on the adjustable volume control, a first audio stream for the conversation and a second audio stream for the other conversation.

8. The computer-implemented method of claim 1, wherein the pane is presented, within the teleconferencing interface, adjacent to the plurality of participant interface elements in the conversation.

9. A system for providing enhanced teleconferencing, the system comprising:
    at least one processor; and
    a memory storing instructions that, when executed by the at least one processor, cause the system to perform operations comprising:
        presenting, in a teleconferencing interface, a first plurality of participant interface elements in a conversation;
        presenting, in the teleconferencing interface, a pane including one or more conversation indicators for one or more respective other conversations, wherein the pane includes an exploration tab;
        receiving a selection of the exploration tab;
        in response to receiving the selection of the exploration tab, presenting, in the pane, participants of the one or more respective other conversations and topics being discussed in the one or more respective other conversations;
        receiving a selection of a conversation indicator for another conversation; and
        in response to receiving the selection of the conversation indicator for the other conversation, presenting, in the teleconferencing interface, a second plurality of participant interface elements in the other conversation.

10. The system of claim 9, wherein the operations further comprise:
    receiving audio streams from client devices of participants of the other conversation;
    converting the audio streams to text; and
    analyzing the text to identify the topic.

11. The system of claim 10, wherein the operations further comprise:
    based on the analysis of the text, determining a sentiment associated with the topic; and
    based on the sentiment, presenting a sentiment indicator adjacent to the topic.

12. The system of claim 9, wherein the operations further comprise presenting, in the pane, a list of trending topics across the one or more respective other conversations, wherein the list of trending topics is based on analysis of audio streams from the one or more respective other conversations.

13. The system of claim 9, wherein the operations further comprise:
 presenting an adjustable volume control element for controlling a volume; and
 outputting, based on the adjustable volume control, a first audio stream for the conversation and a second audio stream for the other conversation.

14. The system of claim 9, wherein the pane is presented, within the teleconferencing interface, adjacent to the plurality of participant interface elements in the conversation.

15. Computer storage media storing instructions that, when executed by at least one processor, cause the at least one processor to perform operations comprising:
 presenting, in a teleconferencing interface, a first plurality of participant interface elements in a conversation;
 presenting, in the teleconferencing interface, a pane including one or more conversation indicators for one or more respective other conversations, wherein the pane includes an exploration tab;
 receiving a selection of the exploration tab;
 in response to receiving the selection of the exploration tab, presenting, in the pane, participants of the one or more respective other conversations and topics being discussed in the one or more respective other conversations;
 receiving a selection of a conversation indicator for another conversation; and
 in response to receiving the selection of the conversation indicator for the other conversation, presenting, in the teleconferencing interface, a second plurality of participant interface elements in the other conversation.

16. The computer storage media of claim 15, wherein the operations further comprise:
 receiving audio streams from client devices of participants of the other conversation;
 converting the audio streams to text;
 analyzing the text to identify the topic;
 based on the analysis of the text, determining a sentiment associated with the topic; and
 based on the sentiment, presenting a sentiment indicator adjacent to the topic.

* * * * *